US012215658B2

(12) United States Patent
Steele et al.

(10) Patent No.: US 12,215,658 B2
(45) Date of Patent: Feb. 4, 2025

(54) FUEL INJECTOR WITH RADIALLY ORIENTABLE NOZZLE HOLES USING SPLINES

(71) Applicant: Cummins Inc., Columbus, IN (US)

(72) Inventors: Jordan P. Steele, Franklin, IN (US); Michael A. Lucas, Columbus, IN (US); Derek G. Weiler, North Vernon, IN (US)

(73) Assignee: Cummins Inc., Columbus, IN (US)

( * ) Notice: Subject to any disclaimer, the term of this patent is extended or adjusted under 35 U.S.C. 154(b) by 568 days.

(21) Appl. No.: 17/602,363

(22) PCT Filed: Apr. 15, 2019

(86) PCT No.: PCT/US2019/027445

§ 371 (c)(1),
(2) Date: Oct. 8, 2021

(87) PCT Pub. No.: WO2020/214140

PCT Pub. Date: Oct. 22, 2020

(65) Prior Publication Data

US 2022/0178335 A1 Jun. 9, 2022

(51) Int. Cl.
*F02M 61/18* (2006.01)
*F02M 61/16* (2006.01)

(52) U.S. Cl.
CPC .......... *F02M 61/18* (2013.01); *F02M 61/168* (2013.01); *F02M 2200/8015* (2013.01)

(58) Field of Classification Search
CPC ...... F02M 61/12; F02M 61/14; F02M 61/168; F02M 63/00012; F02M 2200/8015;
(Continued)

(56) References Cited

U.S. PATENT DOCUMENTS 1,547,759 A * 7/1925 Journeay ............... E21B 17/046 285/85
1,970,801 A * 8/1934 Hurst ..................... F02M 61/14 239/289

(Continued)

FOREIGN PATENT DOCUMENTS

DE 102005012682 A1 10/2005
DE 102006049532 A1 4/2008

(Continued)

OTHER PUBLICATIONS

European Patent Office, EP Search Report Report issued in corresponding EP Application No. 199251393.8, dated Sep. 20, 2022, 6 pgs.

(Continued)

*Primary Examiner* — John M Zaleskas
(74) *Attorney, Agent, or Firm* — Taft, Stettinius & Hollister LLP

(57) ABSTRACT

The present disclosure provides a fuel injector, comprising: a body including a plurality of body alignment features; a nozzle including a plurality of nozzle alignment features and a plurality of nozzle holes for injecting fuel; and a plurality of alignment guides configured to mate with the plurality of body alignment features and the plurality of nozzle alignment features to align the nozzle with the body such that the plurality of nozzle holes is in a desired orientation relative to the body.

20 Claims, 24 Drawing Sheets

(58) Field of Classification Search
CPC ..... F16L 37/113; F16L 37/252; F16L 19/065; F16L 19/005
USPC ........................................ 239/533.2; 285/330
See application file for complete search history.

(56) References Cited

U.S. PATENT DOCUMENTS

| | | | | |
|---|---|---|---|---|
| 2,089,168 | A * | 8/1937 | Brown | F16D 1/0882 403/259 |
| 4,236,736 | A * | 12/1980 | Anderson | F16L 33/224 285/125.1 |
| 4,946,106 | A * | 8/1990 | Turchi | F02M 47/027 239/96 |
| 5,016,920 | A * | 5/1991 | Anderson | F16L 19/005 285/39 |
| 5,121,731 | A | 6/1992 | Jones | |
| 5,154,350 | A * | 10/1992 | Ausiello | F02M 47/027 239/96 |
| 5,161,742 | A * | 11/1992 | Hofmann | F02M 65/005 239/585.4 |
| 5,232,166 | A * | 8/1993 | Reiter | F02M 61/168 239/585.4 |
| 5,241,935 | A * | 9/1993 | Beck | F02M 59/105 239/96 |
| 5,348,349 | A * | 9/1994 | Sloane | F16L 19/005 285/86 |
| 5,564,633 | A * | 10/1996 | Hardy | F02M 61/168 239/533.2 |
| 5,823,702 | A * | 10/1998 | Bynum | F16L 19/005 285/82 |
| 5,979,866 | A * | 11/1999 | Baxter | F16K 31/0651 137/550 |
| 6,082,333 | A * | 7/2000 | Vattelana | F02M 69/465 123/456 |
| 6,325,049 | B1 | 12/2001 | Nally | |
| 6,460,900 | B1 * | 10/2002 | Bakke | E21B 17/20 285/330 |
| 6,609,667 | B2 * | 8/2003 | Kiriki | F02M 47/027 239/533.2 |
| 6,623,047 | B2 * | 9/2003 | Olechnowicz | F16L 17/06 285/379 |
| 6,655,612 | B2 * | 12/2003 | Oliver | F02M 51/0671 239/585.4 |
| 6,814,312 | B2 * | 11/2004 | Iwano | F02M 61/16 239/585.4 |
| 7,107,969 | B2 | 9/2006 | Norcutt et al. | |
| 7,128,055 | B2 * | 10/2006 | Zdroik | F02M 69/465 123/468 |
| 7,407,120 | B1 * | 8/2008 | French | F02M 51/0675 239/585.5 |
| 7,559,583 | B2 * | 7/2009 | Stoetzer | E21B 17/046 285/330 |
| 7,887,098 | B2 * | 2/2011 | Aas | E21B 17/043 285/391 |
| 7,918,209 | B2 * | 4/2011 | Fischetti | F02M 61/14 123/470 |
| 8,047,183 | B2 | 11/2011 | Aronhalt et al. | |
| 8,316,825 | B1 * | 11/2012 | French, III | F02M 51/0671 123/472 |
| 8,997,717 | B2 | 4/2015 | Roseborsky et al. | |
| 9,188,261 | B2 * | 11/2015 | Marc | F16L 19/005 |
| 9,206,779 | B2 * | 12/2015 | Rodriguez-Amaya | F02M 47/06 |
| 10,012,196 | B1 | 7/2018 | Qi et al. | |
| 10,711,752 | B2 * | 7/2020 | Martin | F02M 61/168 |
| 11,073,120 | B2 | 7/2021 | Naumann et al. | |
| 2002/0070296 | A1 * | 6/2002 | Perry | F02M 61/188 239/533.3 |
| 2004/0046059 | A1 * | 3/2004 | Kienzler | F02M 61/16 239/533.2 |
| 2004/0232259 | A1 * | 11/2004 | Kienzler | F02M 61/168 239/533.2 |
| 2005/0023831 | A1 * | 2/2005 | Hughes | E21B 17/046 285/332 |
| 2006/0065244 | A1 * | 3/2006 | Norcutt | F02M 55/02 123/470 |
| 2007/0145163 | A1 | 6/2007 | Manubolu et al. | |
| 2007/0228185 | A1 * | 10/2007 | Matsumoto | F02M 47/027 239/533.3 |
| 2008/0121215 | A1 * | 5/2008 | Frasch | F02M 51/005 123/472 |
| 2008/0210784 | A1 * | 9/2008 | Ganser | F02M 61/16 239/533.11 |
| 2010/0258656 | A1 * | 10/2010 | Crossley | F02M 61/168 239/584 |
| 2011/0180273 | A1 * | 7/2011 | Hughes | E21B 17/042 166/242.6 |
| 2012/0031996 | A1 * | 2/2012 | Harvey | F02M 69/465 239/289 |
| 2012/0152206 | A1 * | 6/2012 | Adachi | F02M 61/168 123/445 |
| 2013/0068582 | A1 * | 3/2013 | Kim | F16D 23/06 419/29 |
| 2014/0007845 | A1 * | 1/2014 | Atzkern | F02M 61/168 123/470 |
| 2014/0123937 | A1 * | 5/2014 | Wickstone | F02M 63/007 123/299 |
| 2015/0240770 | A1 | 8/2015 | Hofmann et al. | |
| 2016/0327002 | A1 * | 11/2016 | Shimizu | F02M 61/168 |
| 2020/0256298 | A1 * | 8/2020 | Warne | F02M 61/14 |
| 2023/0407829 | A1 * | 12/2023 | Phillips | F02M 61/18 |

FOREIGN PATENT DOCUMENTS

| | | | | |
|---|---|---|---|---|
| DE | 102010039980 A1 | | 3/2012 | |
| DE | 102014221860 A1 | | 4/2016 | |
| JP | 2005299641 A | * | 10/2005 | F02M 61/168 |

OTHER PUBLICATIONS

International Search Report and Written Opinion issued by the ISA/US, Commissioner for Patents, Dated Jun. 27, 2019, for International Application No. PCT/US2019/027445; 7 pages.
European Patent Office, EP Search Report issued in corresponding EP Application No. 199251393.8, dated Apr. 18, 2024, 5 pgs.

* cited by examiner

FIG. 1 – PRIOR ART

FIG. 2 – PRIOR ART

FIG. 3 – PRIOR ART

FIG. 4 – PRIOR ART

FIG. 5 – PRIOR ART

FUEL INJECTOR WITH RADIALLY ORIENTABLE NOZZLE HOLES USING SPLINES

CROSS-REFERENCE TO RELATED APPLICATIONS

This application is a national phase application of International Application No. PCT/US2019/027445, filed Apr. 15, 2019, the entire disclosures of which is incorporated herein by reference.

TECHNICAL FIELD

The present invention relates generally to fuel injectors and more particularly to fuel injectors having components configured to provide automatic radial orientation of nozzle spray holes.

BACKGROUND

Fuel injectors are generally electrically actuated devices coupled to a fuel source and configured to deliver metered quantities of fuel to combustion chambers of an internal combustion engine. In certain applications, a fuel injector includes a tip with nozzle spray holes that extends into the combustion chamber. The spray holes are spaced apart at the nozzle tip to deliver a desired spray pattern of fuel. There are benefits to precisely aligning the spray holes within the combustion chamber to achieve the desired spray pattern, such as improved fuel efficiency and reduced emissions.

Conventionally, when a fuel injector nozzle including the tip is connected to a fuel injector body, the orientation of the spray holes relative to the body (and therefore relative to the combustion chamber when the fuel injector is installed) was difficult to control. Large fixtures were needed in combination with one or more cameras to align the spray holes to achieve a particular spray pattern. Such an approach is time consuming and costly, and not suitable for use in a high-volume production environment. As such, there is a need to configure a fuel injector such that when the nozzle is connected to the body, the spray holes are automatically positioned in a desired orientation relative to the body and the combustion chamber.

SUMMARY

In one embodiment, the present disclosure provides a fuel injector, comprising: a body including a plurality of body alignment features; a nozzle including a plurality of nozzle alignment features and a plurality of nozzle holes for injecting fuel; and a clocking ring having a plurality of alignment guides configured to mate with the plurality of body alignment features and the plurality of nozzle alignment features to align the nozzle with the body such that the plurality of nozzle holes is in a desired orientation relative to the body. In one aspect of this embodiment, the body includes a first sealing surface and the nozzle includes a second sealing surface in contact with the first sealing surface to form an interface seal. In a variant of this aspect, the plurality of body alignment features includes a plurality of body recesses formed into an external surface of the body and the plurality of nozzle alignment features includes a plurality of nozzle recesses formed into an external surface of the nozzle. In a further variant, the plurality of body recesses are grooves, each groove in the body having one end adjacent the first sealing surface, and the plurality of nozzle recesses are grooves, each groove in the nozzle having one end adjacent the second sealing surface. In another aspect of this embodiment, the plurality of alignment guides are splines formed on an interior surface of a ring. In a variant of this aspect, the plurality of body alignment features includes a pair of body grooves formed into an external surface of the body, the plurality of nozzle alignment features includes a pair of nozzle grooves formed into an external surface of the nozzle, and the splines includes a pair of splines spaced apart from one another by less than 180 degrees in one circumferential direction along the interior surface of the ring and disposed to engage the pair of body grooves and the pair of nozzle grooves to inhibit rotation of the body and the nozzle relative to one another. Another variant of this aspect further comprises a nozzle retainer being removably secured to the body and having an interior volume that receives a portion of the body, the ring, and a portion of the nozzle. Another aspect of this embodiment further comprises a nozzle retainer including one end configured to mate with an outer surface of the body and another end having a shoulder configured to retain the nozzle in engagement with the body. In a variant of this aspect, the one end of the nozzle retainer includes internal threads and the outer surface of the body includes external threads that mate with the internal threads of the nozzle retainer to attach the nozzle retainer to the body.

In another embodiment, the present disclosure provides a method of assembling a fuel injector, comprising: placing a ring having internal splines onto a portion of an injector body having external body grooves that receive the internal splines; and placing an injector nozzle into the ring to engage the injector body, the injector nozzle having external nozzle grooves that receive the internal splines. In one aspect of this embodiment, placing the injector nozzle into the ring includes forming a sealing interface between the injector body and the injector nozzle. A variant of this aspect further comprises placing a nozzle retainer over the injector nozzle, the ring, and the injector body such that a portion of the injector nozzle having nozzle holes extends through an opening in the nozzle retainer. In a further variant, placing the nozzle retainer includes threading the nozzle retainer onto threads formed on an exterior surface of the injector body.

In still another embodiment, the present disclosure provides a fuel injector, comprising: a body having a pair of body grooves formed into an exterior, circumferential surface of one end of the body; a nozzle having a pair of nozzle grooves formed into an exterior, circumferential surface of one end of the nozzle and spaced apart from one another to correspond to a spacing between the pair of body grooves; and a clocking ring having an interior surface with a pair of splines extending therefrom, the pair of splines being disposed circumferentially on the interior surface to slide into the pair of body grooves and the pair of nozzle grooves to retain the body and the nozzle in a desired orientation relative to one another. In one aspect of this embodiment, the body includes a first sealing surface at the one end of the body and the nozzle includes a second sealing surface at the one end of the nozzle, the second sealing surface being in contact with the first sealing surface to form an interface seal. In a variant of this aspect, the clocking ring fits onto the nozzle and the body over the interface seal. Another aspect of this embodiment further comprises a nozzle retainer configured to attach to the body to retain the nozzle in engagement with the body, the nozzle having a distal end with nozzle holes, the distal end extending through an opening in the nozzle retainer. In another aspect, the pair of body grooves are spaced on the circumferential surface of the one end of the body in a radial orientation relative to one another of less than 180 degrees in a first direction. In yet another aspect, the desired orientation of the body and the nozzle corresponds to a desired orientation of nozzle holes formed at an end of the nozzle for injecting fuel into a combustion chamber of an engine.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

Figure 1:
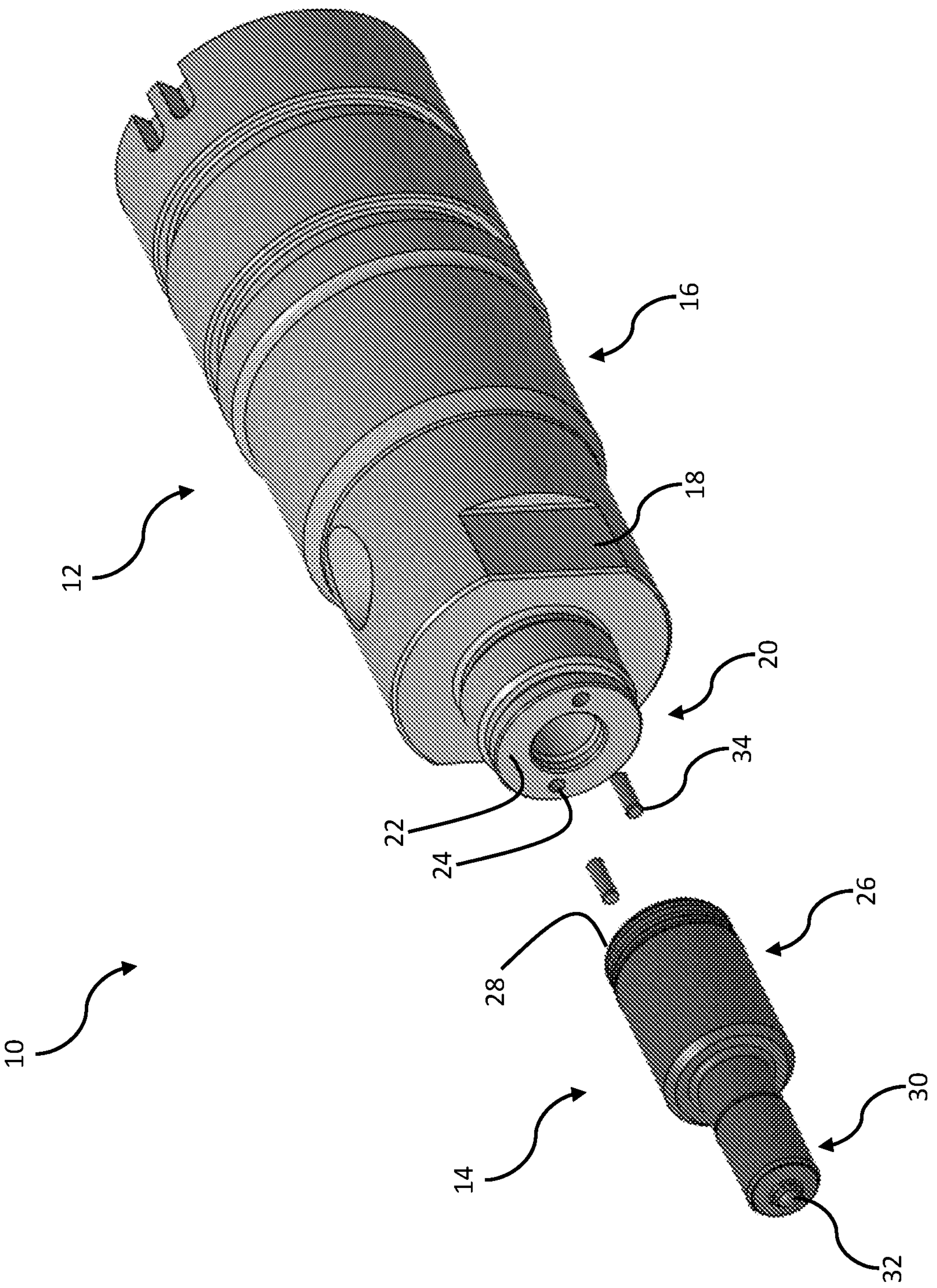
FIG. 1 is an exploded, perspective view of a prior art fuel injector.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

The terms “couples,” “coupled,” and variations thereof are used to include both arrangements wherein two or more components are in direct physical contact and arrangements wherein the two or more components are not in direct contact with each other (e.g., the components are “coupled” via at least a third component), but yet still cooperate or interact with each other. Furthermore, the terms “couples,” “coupled,” and variations thereof refer to any connection for machine parts known in the art, including, but not limited to, connections with bolts, screws, threads, magnets, electromagnets, adhesives, friction grips, welds, snaps, clips, etc.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

FIG. 1 depicts a prior art fuel injector 10 with nozzle holes aligned using pins. Fuel injector 10 generally includes a body 12 and a nozzle 14. Body 12 includes an upper portion 16 having at least one datum 18 and a lower portion 20 having a sealing surface 22 with a plurality of body alignment features (here, a pair of bores 24) formed therein. Nozzle 14 includes an upper portion 26 with a sealing surface 28 having a plurality of nozzle alignment features (here, a pair of bores 36 (FIG. 5)) formed therein. Nozzle 14 also includes a lower portion 30 having a plurality of spray holes or nozzle holes 32. Fuel injector 10 also includes a plurality of alignment guides (in this embodiment, a pair of pins 34) sized to fit within bores 24 of body 12 and corresponding bores 36 (best shown in FIG. 5) of nozzle 14. As is described below, the precise orientation of bores 24, 36 relative to datum 18 and use of alignment guides in the form of pins 34 results in a precise orientation of nozzle 14 (and nozzle holes 32) relative to datum 18. As datum 18 is formed to orient fuel injector 10 in an injector bore (not shown) of a cylinder head (not shown), and therefore relative to the combustion chamber, the precise orientation of nozzle holes 32 relative to datum 18 results in precise orientation of nozzle holes 32 relative to the combustion chamber. It should be understood that other features of body 12 may be used as a reference for alignment of nozzle holes 32 such as a high pressure hole in body 12.

Figure 2:
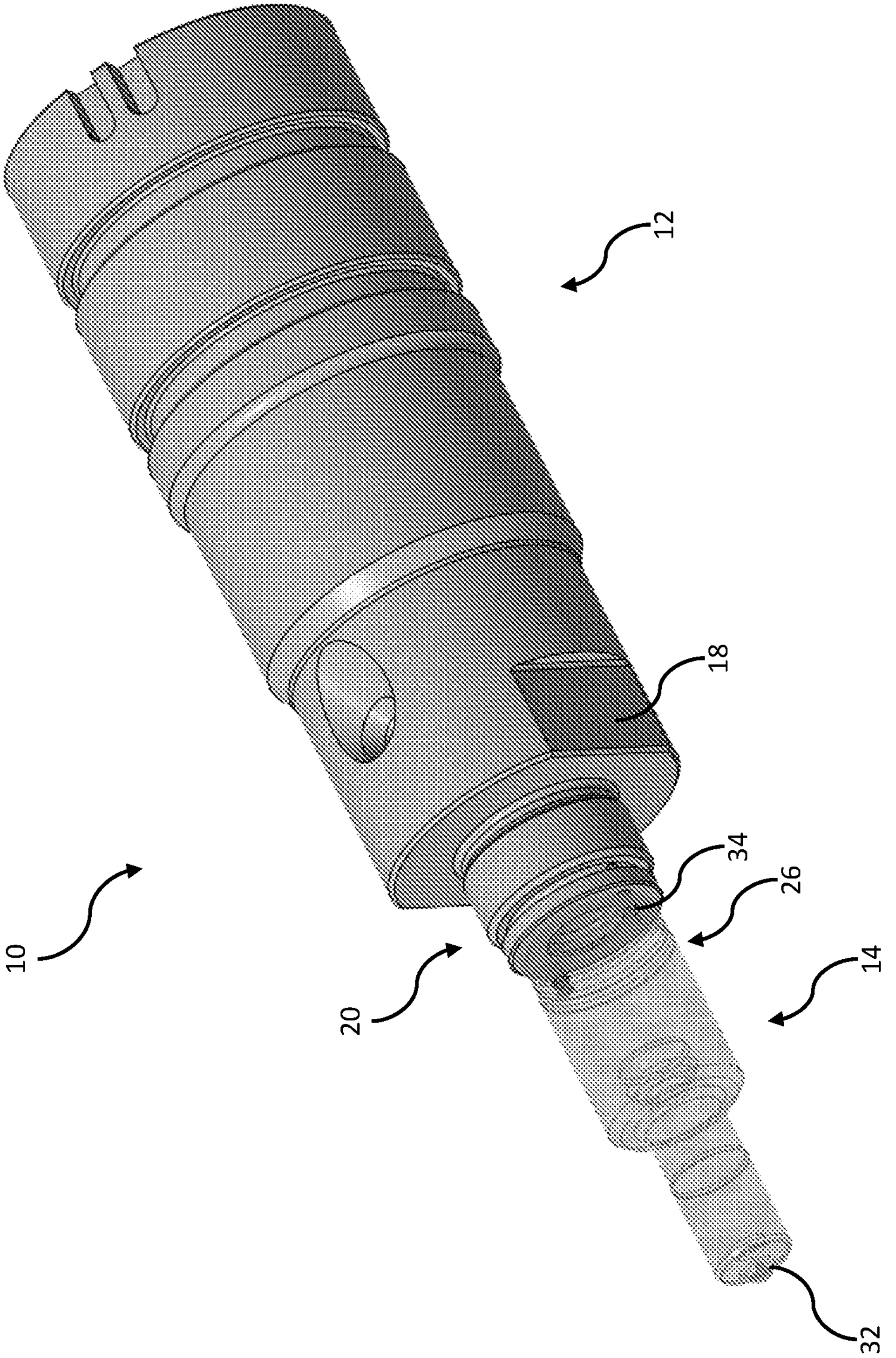
FIG. 2 is a perspective, partial phantom view of the prior art fuel injector of FIG. 1 in an assembled state.
Figure 3:
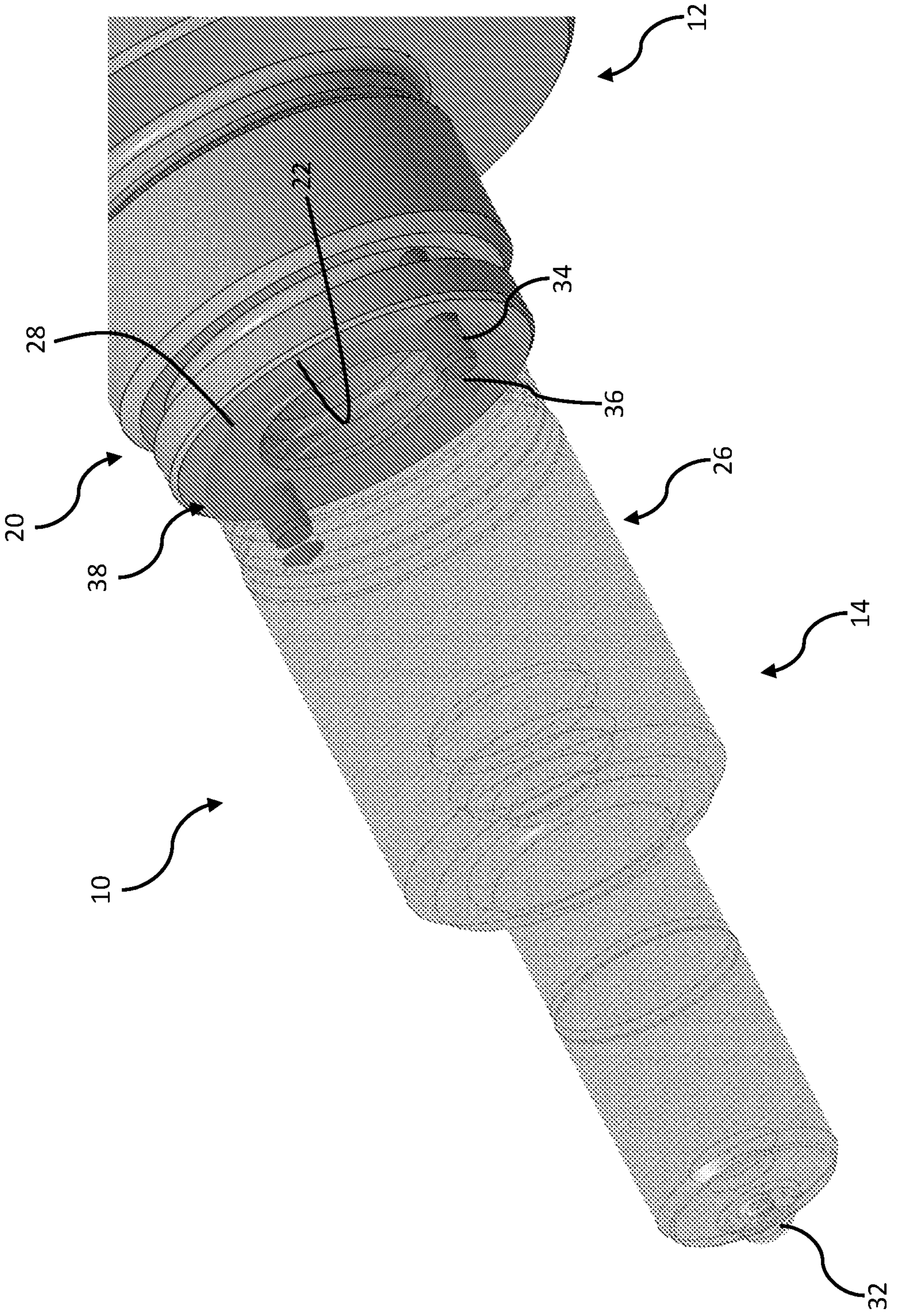
FIG. 3 is an enlarged portion of FIG. 2.

As shown in FIGS. 2 and 3, when nozzle 14 is coupled to body 12, pins 34 extend into bores 24 of lower portion 20 of body 12 and into bores 36 of upper portion 26 of nozzle 14. As such, pins 34 align nozzle 14 relative to body 12, thereby aligning nozzle holes 32 relative to datum 18 (and ultimately relative to the combustion chamber). Additionally (referring to FIG. 3), when nozzle 14 is coupled to body 12, sealing surface 28 of nozzle 14 engages sealing surface 22 of body 12, thereby forming a sealing interface 38. This sealing interface 38 inhibits fuel from escaping from the central fuel chamber of fuel injector 10 during operation.

Figure 4:
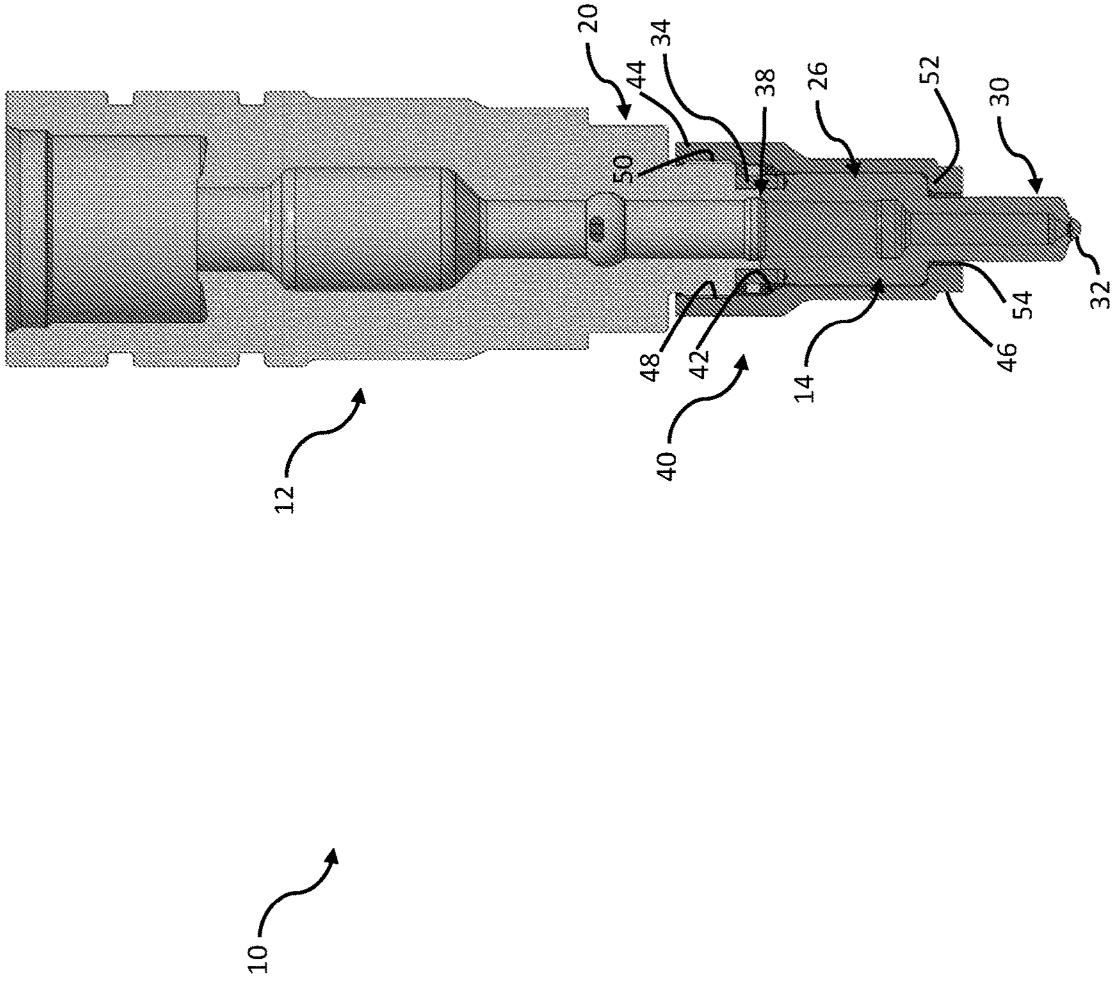
FIG. 4 is a side, cross-sectional view of the prior art fuel injector of FIG. 1 with a lower end assembly in a fully assembled state.
Figure 5:
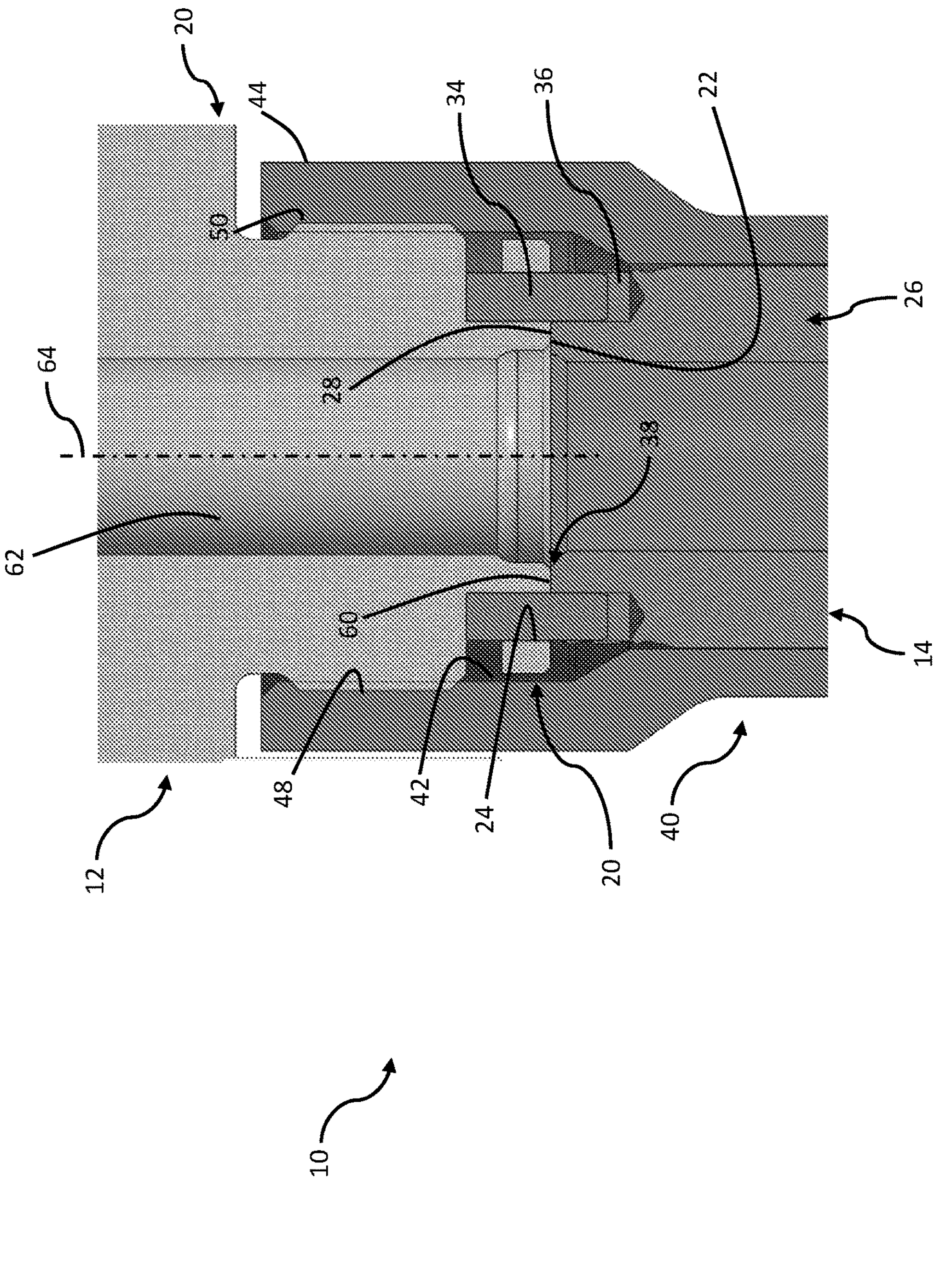
FIG. 5 is an enlarged portion of FIG. 4.

Referring now to FIGS. 4 and 5, fuel injector 10 further includes a nozzle retainer 40 that is configured to retain sealing surface 28 of nozzle 14 in contact with sealing surface 22 of body 12. Nozzle retainer 40 includes a central opening 42, an upper end 44, and a lower end 46. In this example, upper end 44 includes internal threads 48 that mesh with external threads 50 formed on an external surface of lower portion 20 of body 12. The engagement of threads 48 with threads 50 connects nozzle retainer 40 to body 12. Lower end 46 of nozzle retainer 40 includes a shoulder 52 and a nozzle opening 54. Shoulder 52 engages upper portion 26 of nozzle 14 when threads 48 are threaded onto threads 50 and urges nozzle 14 upwardly into engagement with body 12 to form sealing interface 38. Lower portion 30 of nozzle 14 extends through nozzle opening 54 of nozzle retainer 40 as best shown in FIG. 4.

Use of pins 34 to align nozzle 14 relative to body 12 reduces the surface area of sealing interface 38 adjacent the locations of the pins 34. As shown in FIG. 5, a relatively short radial distance 60 exists at sealing interface 38 in the location of pins 34 between the fuel chamber 62 and bores 24 of lower portion 20. This may reduce the efficacy of sealing interface 38 relative to fuel injector embodiments according to the present disclosure as described herein. Additionally, bores 24 of body 12 and bores 36 of nozzle 14 are formed relatively close to a central axis 64 of fuel injector 10. As such, the radial error of the orientation of nozzle 14 (and nozzle holes 32) relative to body 12 resulting from the size tolerance between pins 34 and bores 24, 36 may be relatively high as compared to embodiments of the present disclosure as will be further described below. Moreover, under high loads (such as when nozzle retainer 40 is threaded onto body 12) rotational torque may be applied to pins 34 causing them to shear and become free-floating debris inside injector 10 or trapped in sealing interface 38.

Figure 6:
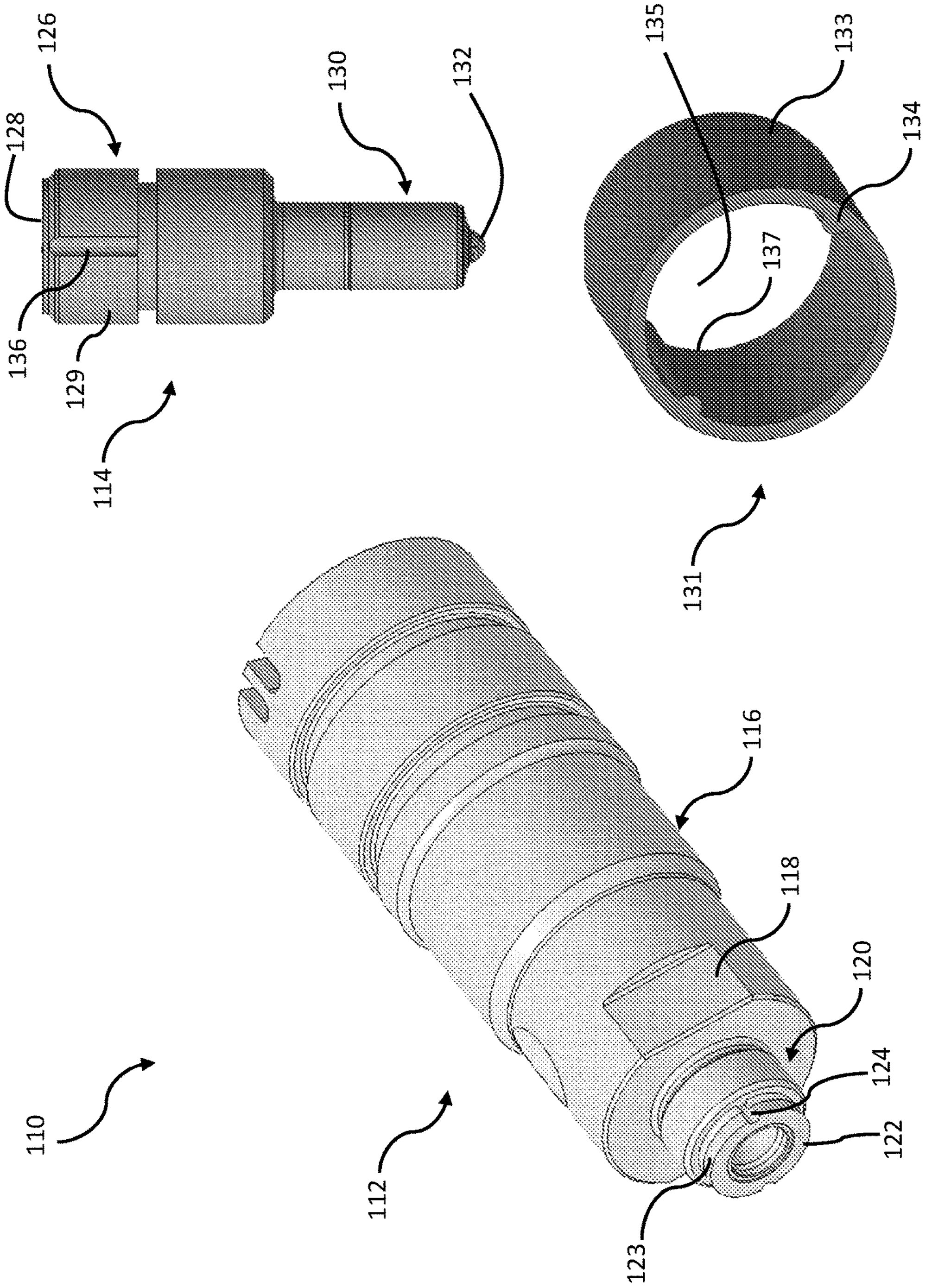
FIG. 6 is an exploded, perspective view of a fuel injector according to another embodiment of the present disclosure.

Referring now to FIG. 6, one embodiment of a fuel injector 110 according to present disclosure is shown. Fuel injector 110 generally includes a body 112 and a nozzle 114. Body 112 includes an upper portion 116 having at least one datum 118 and a lower portion 120 having a sealing surface 122 and a plurality of body alignment features (in this embodiment, a pair of grooves 124) extending from sealing surface 122 along a side wall 123 of lower portion 120. Nozzle 114 includes an upper portion 126 with a sealing surface 128 having a plurality of nozzle alignment features (in this embodiment, a pair of grooves 136) extending from sealing surface 128 along a side wall 129 of upper portion 126. Nozzle 114 also includes a lower portion 130 having a plurality of spray holes or nozzle holes 132. Fuel injector 110 further includes a clocking ring 131 having a substantially cylindrical side wall 133 defining a central opening 135. A plurality of alignment guides (in this embodiment, splines 134) are formed on an interior surface 137 of side wall 133. Splines 134 are sized to fit within grooves 124 of body 112 and grooves 136 of nozzle 114 when ring 131 is placed over nozzle 114 and body 112 as is further described below. The precise orientation of grooves 124, 136 relative to datum 118 and use of splines 134 results in a precise orientation of nozzle 114 relative to datum 118, which precisely orients nozzle holes 132 relative to the combustion chamber in the manner described above with reference to FIGS. 1-5.

Figure 7:
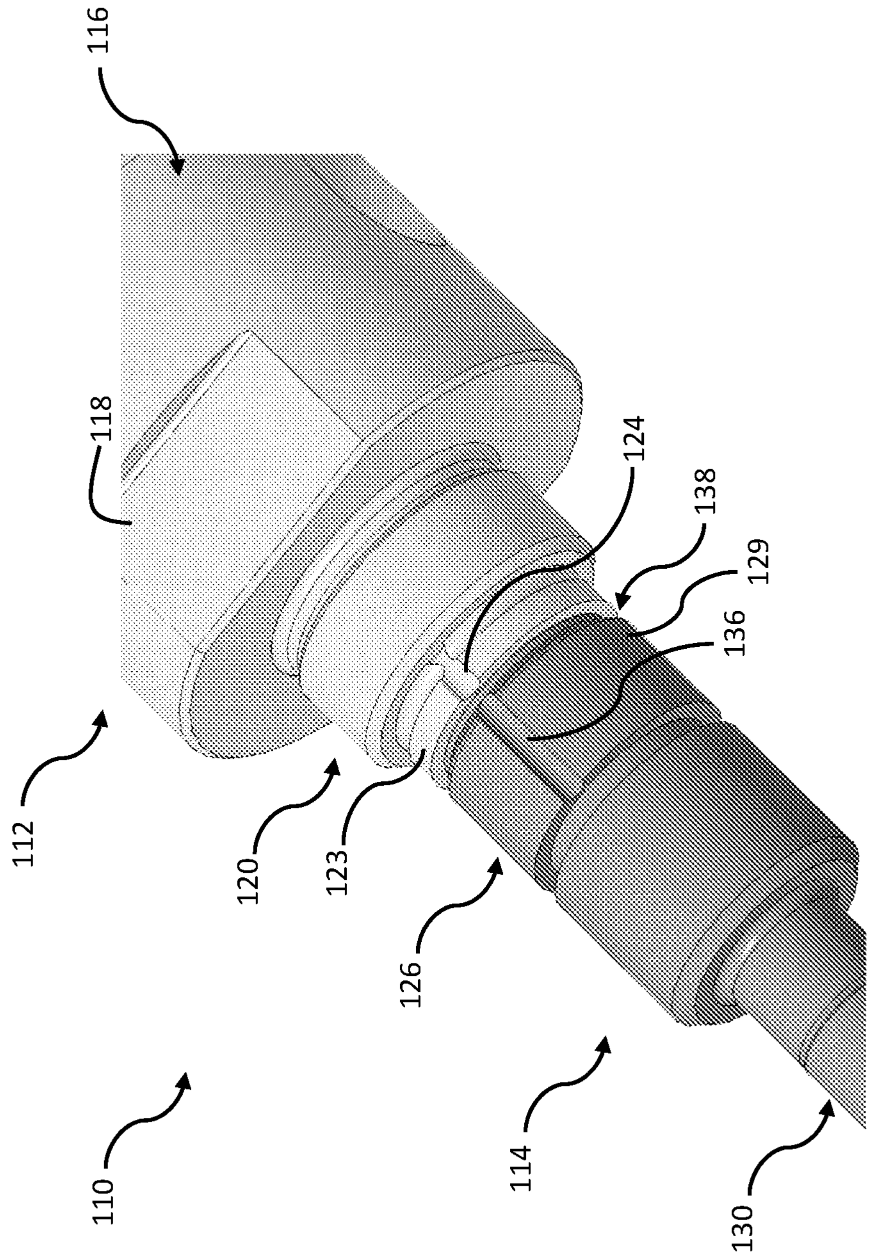
FIG. 7 is a partial perspective view of the fuel injector of FIG. 6 in a first partially assembled state.
Figure 8:
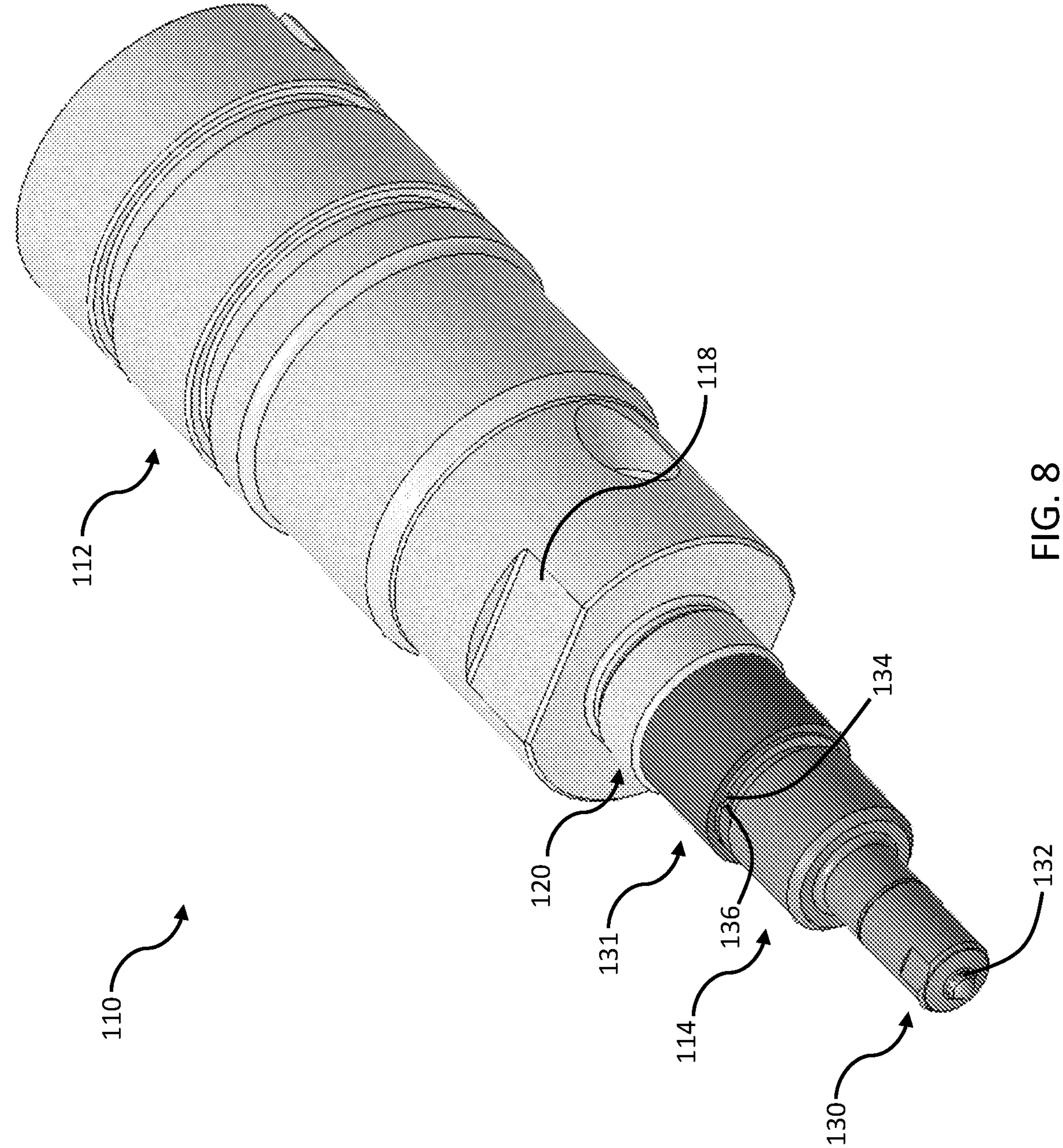
FIG. 8 is a perspective view of the fuel injector of FIG. 6 in a second partially assembled state.
Figure 9:
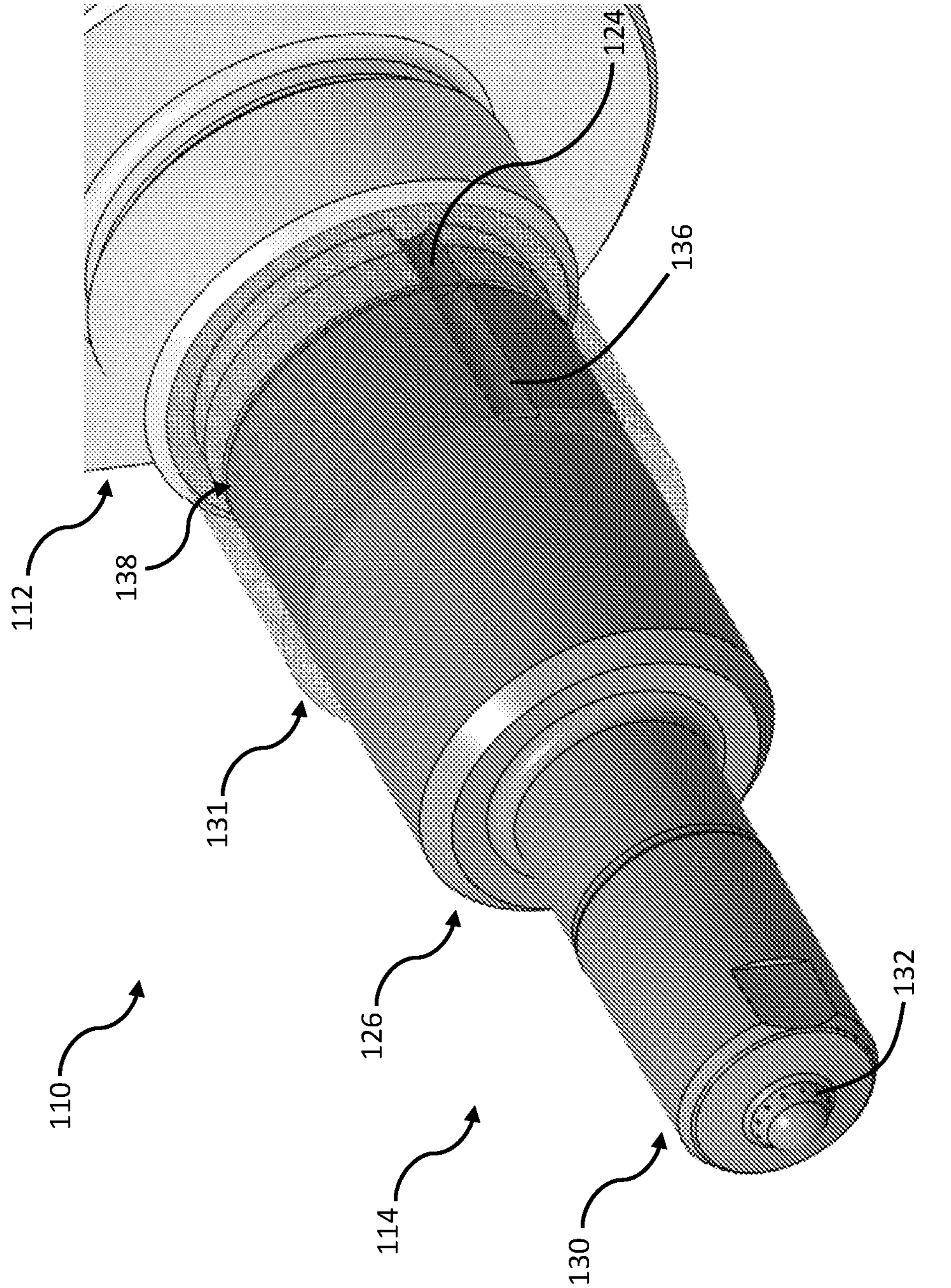
FIG. 9 is an enlarged portion of FIG. 8 shown partly in phantom.

As shown in FIG. 7, when nozzle 114 is coupled to body 112, grooves 124 of lower portion 120 of body 112 are aligned with grooves 136 of upper portion 126 of nozzle 114. Referring to FIGS. 8 and 9, the alignment of grooves 124 with grooves 136 is fixed by installation of ring 131 when splines 134 of ring 131 are slid into grooves 136, 124. As such, splines 134 align nozzle 114 relative to body 112, thereby aligning nozzle holes 132 relative to datum 118 (and ultimately relative to the combustion chamber). Additionally, when nozzle 114 is coupled to body 112, sealing surface 128 of nozzle 114 engages sealing surface 122 of body 112, thereby forming a sealing interface 138 (FIGS. 7 and 9). This sealing interface 138 inhibits fuel from escaping from the central fuel chamber of fuel injector 110 during operation.

Figure 10:
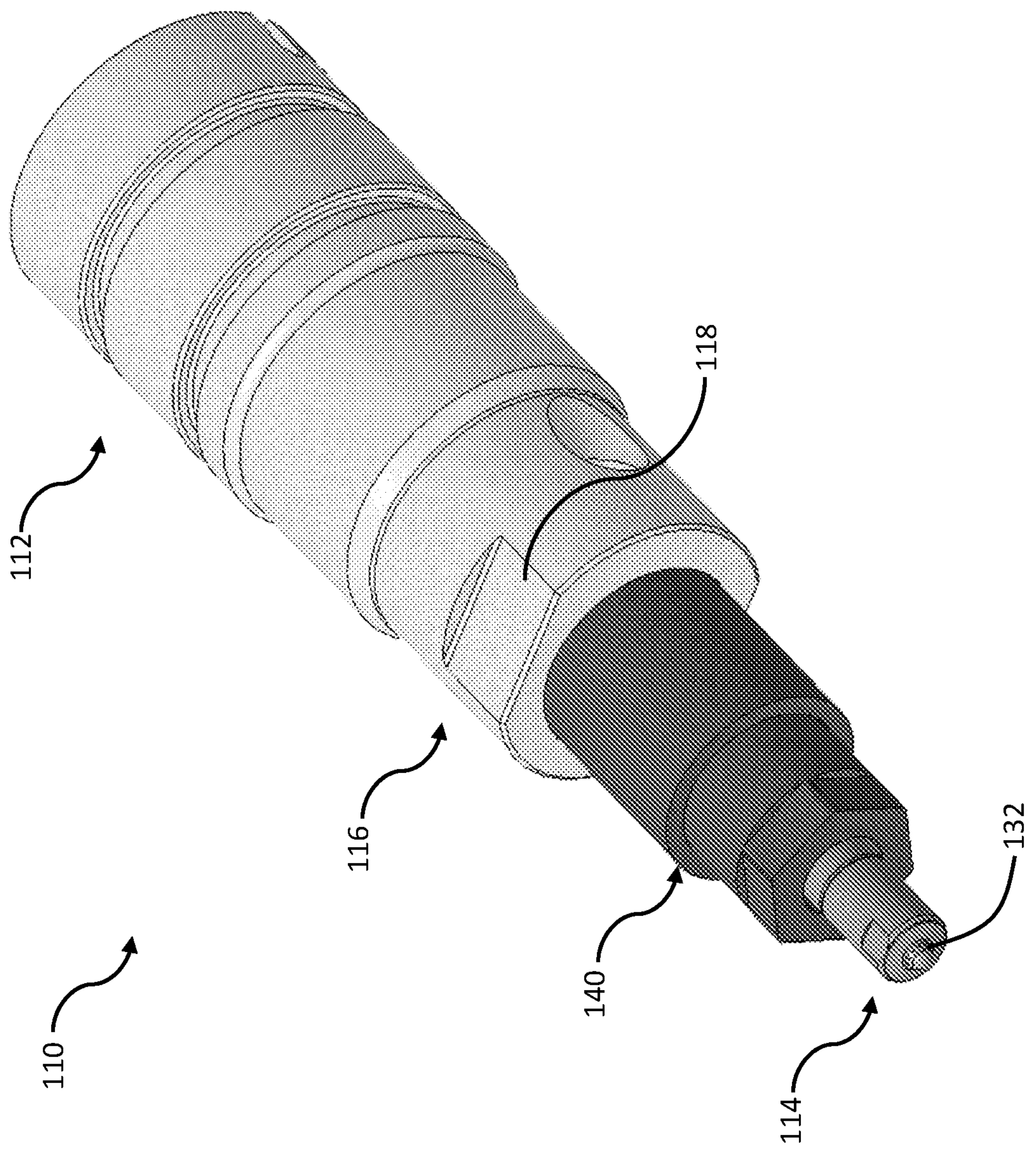
FIG. 10 is a perspective view of the fuel injector of FIG. 6 with a lower end assembly in a fully assembled state.
Figure 11:
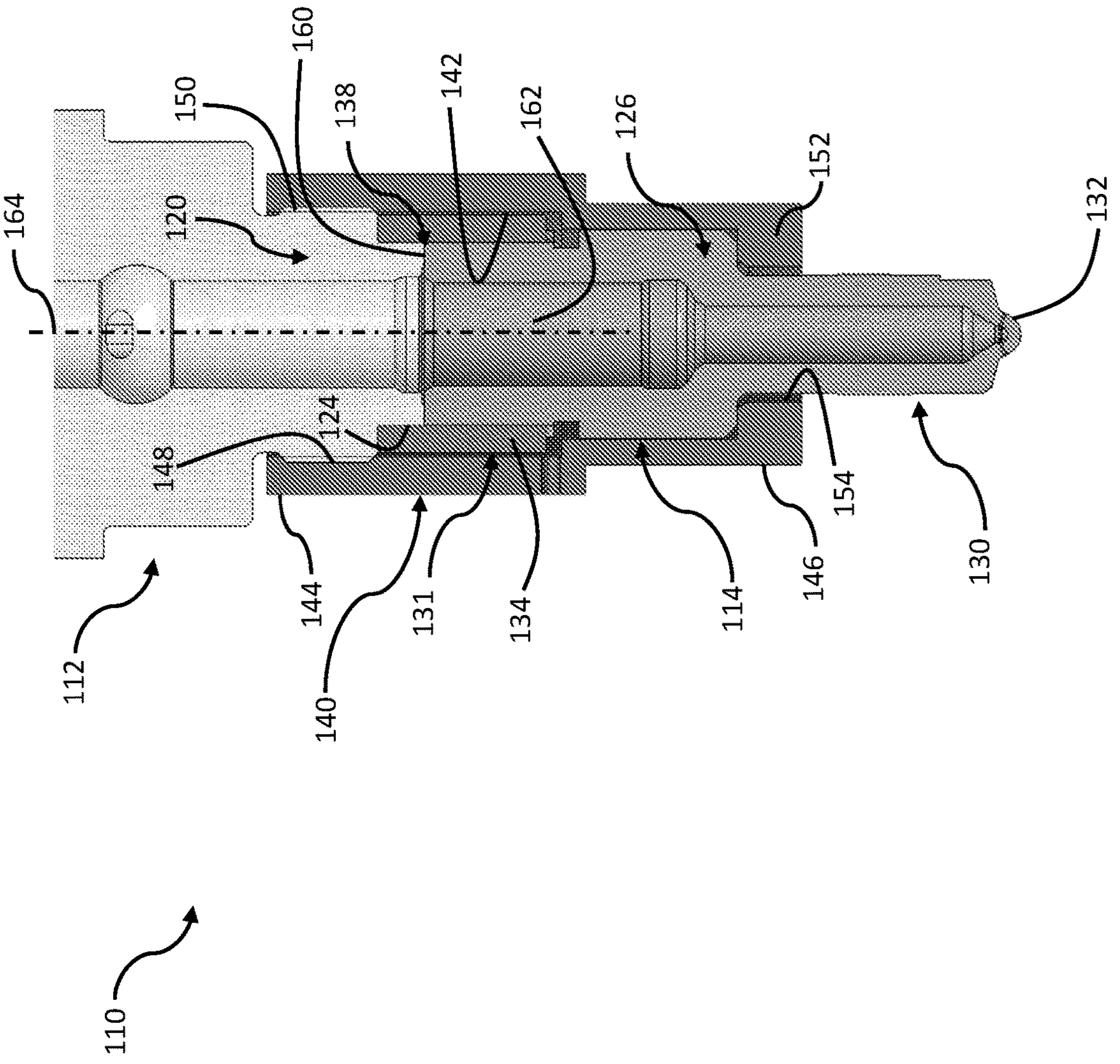
FIG. 11 is a side, cross-sectional view of the fuel injector of FIG. 6 in a partially assembled state.

Referring now to FIGS. 10 and 11, fuel injector 110 further includes a nozzle retainer 140 that is configured to retain sealing surface 128 of nozzle 114 in contact with sealing surface 122 of body 112. Nozzle retainer 140 includes a central opening 142, an upper end 144, and a lower end 146. In one embodiment, upper end 144 includes internal threads 148 that mesh with external threads 150 formed on an external surface of lower portion 120 of body 112. The engagement of threads 148 with threads 150 connects nozzle retainer 140 to body 112. Lower end 146 of nozzle retainer 140 includes a shoulder 152 and a nozzle opening 154. Shoulder 152 engages upper portion 126 of nozzle 114 when threads 148 are threaded onto threads 150 and urges nozzle 114 upwardly into engagement with body 112 to form sealing interface 138. Lower portion 130 of nozzle 114 extends through nozzle opening 154 of nozzle retainer 140 as best shown in FIG. 11.

As shown in FIG. 11, use of external grooves 124, 136 and internal splines 134 to align nozzle 114 relative to body 112 provides an increased surface area of sealing surface 138 (relative to sealing surface 38) adjacent the locations of grooves 124, 136. A relatively longer radial distance 160 (relative to distance 60 of FIG. 5) exists at sealing interface 138 in the location of splines 134 between the fuel chamber 162 and grooves 124 of lower portion 120. This may improve the efficacy of sealing interface 138 relative to prior art designs. Additionally, grooves 124 of body 112 and grooves 136 of nozzle 114 are formed relatively farther from a central axis 164 of fuel injector 110 (relative to bores 24, 36 of fuel injector 10). As such, the radial error of the orientation of nozzle 114 (and nozzle holes 132) relative to body 112 resulting from the size tolerance between splines 134 and grooves 124, 136 may be relatively low as compared to prior art designs as will be further described below. Moreover, under high loads (such as when nozzle retainer 140 is threaded onto body 112) rotational torque applied to splines 134 may cause them to strip or round off, but not impact the integrity of sealing interface 138. Moreover, clocking ring 131, unlike pins 34, is unlikely to be unknowingly assembled incorrectly or lost.

It should be further understood that more than two grooves 124, 136 and more than two corresponding splines 134 may be used. A larger number of grooves 124, 136 and splines 134 may provide nozzle 114 orientation adjustability to achieve different desired spray patterns of nozzle holes 132. Additionally, grooves 124 of body 112 and grooves 136 of nozzle 114 may be formed in certain embodiments using broaching or wobble broaching, which is a relatively inexpensive, quick process compared to forming very high accuracy, true positioned bores 24, 36. Additionally, splines 134 of clocking ring 131 could be formed using broaching or by forming a complete sintered metal part, which are relatively inexpensive processes. In such an embodiment, splines 134 may be formed before hardening ring 131.

Figure 12:
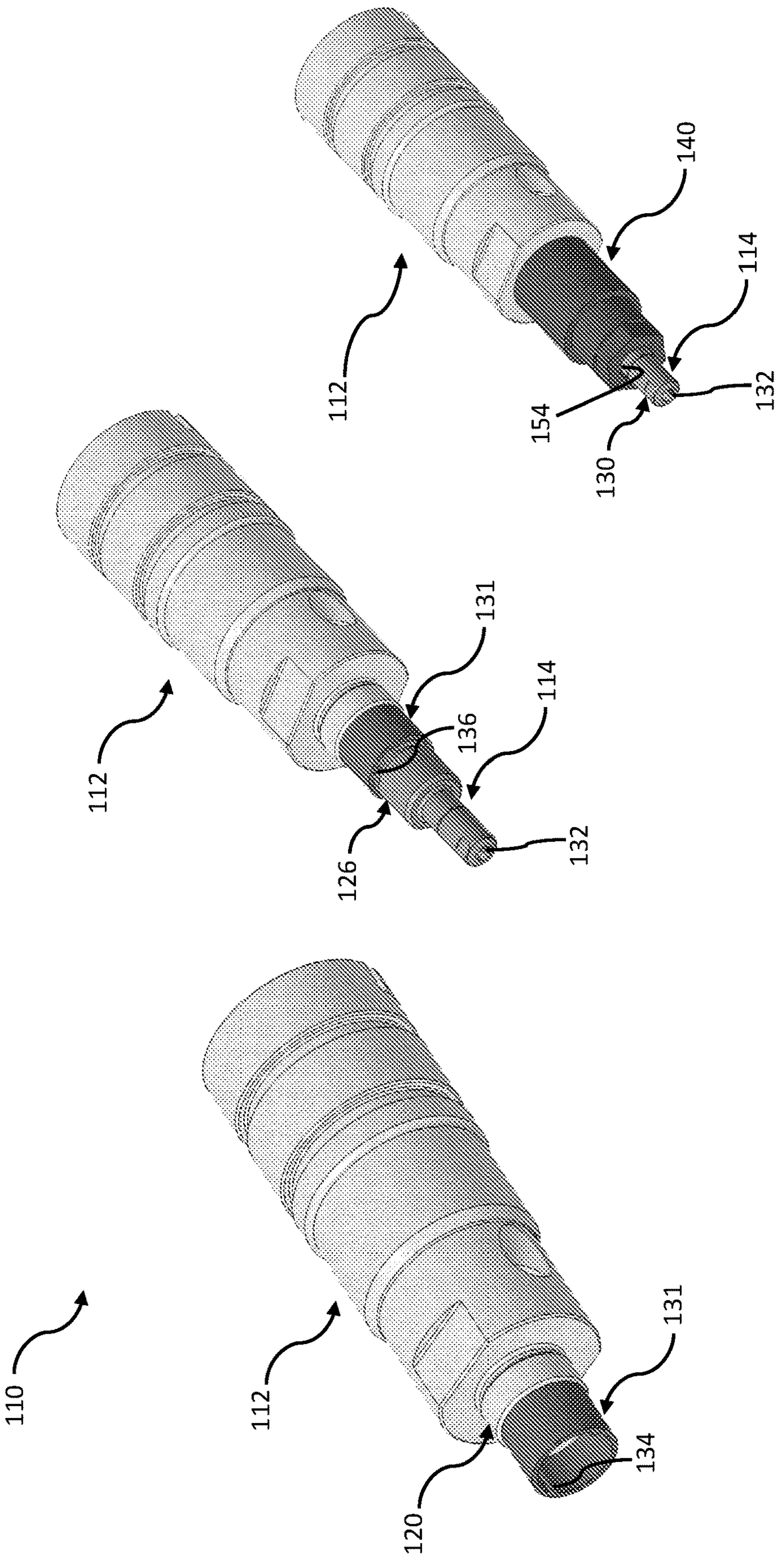
FIG. 12 is a perspective view of the fuel injector of FIG. 6 in various states of assembly.

Referring now to FIG. 12, a method for assembling fuel injector 110 is shown. Describing the images from left to right in the figure, clocking ring 131 is first placed onto lower portion 120 of body 112 such that splines 134 of ring 131 are received by grooves 124 of lower portion 120. Next, nozzle 114 is placed into ring 131 such that grooves 136 of upper portion 126 of nozzle 114 receive splines 134 of ring 131. Nozzle 114 is thus positioned to engage body 112 and form sealing interface 138. As is further shown, nozzle retainer 140 is then placed over nozzle 114, ring 131 and lower portion 120 of body 112 such that lower portion 130 of nozzle 114 (including nozzle holes 132) extends through opening 154 of nozzle retainer 140. Nozzle retainer 140 is threaded onto lower portion 120 of body 112 in the manner described above to connect nozzle retainer 140 to body 112 and urge nozzle 114 into engagement with body 112 thereby forming sealing interface 138.

Figure 13:
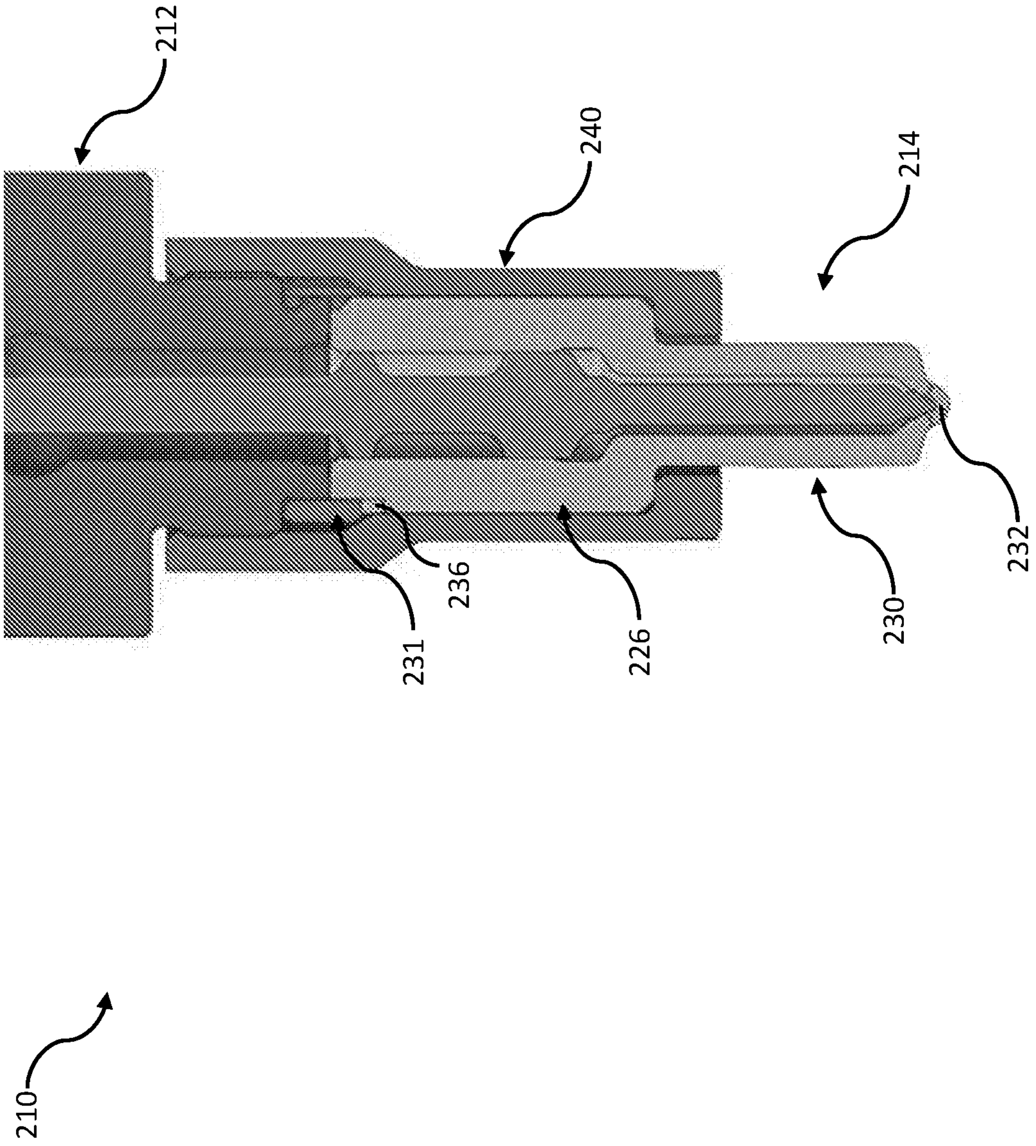
FIG. 13 is a side, cross-sectional view of a fuel injector according to another embodiment of the present disclosure.

Referring now to FIG. 13, another embodiment of a fuel injector 210 is shown. Fuel injector 210 is similar in many respects to fuel injector 110, and only the differences are described in detail herein. In fuel injector 210, grooves 236 are substantially shorter than grooves 136 of fuel injector 110. Additionally, clocking ring 231 is substantially shorter along the length of side wall 233 than clocking ring 131. Consequently, nozzle retainer 240 may be formed to better conform to the shape of upper portion 226 of nozzle 214.

Figure 14:
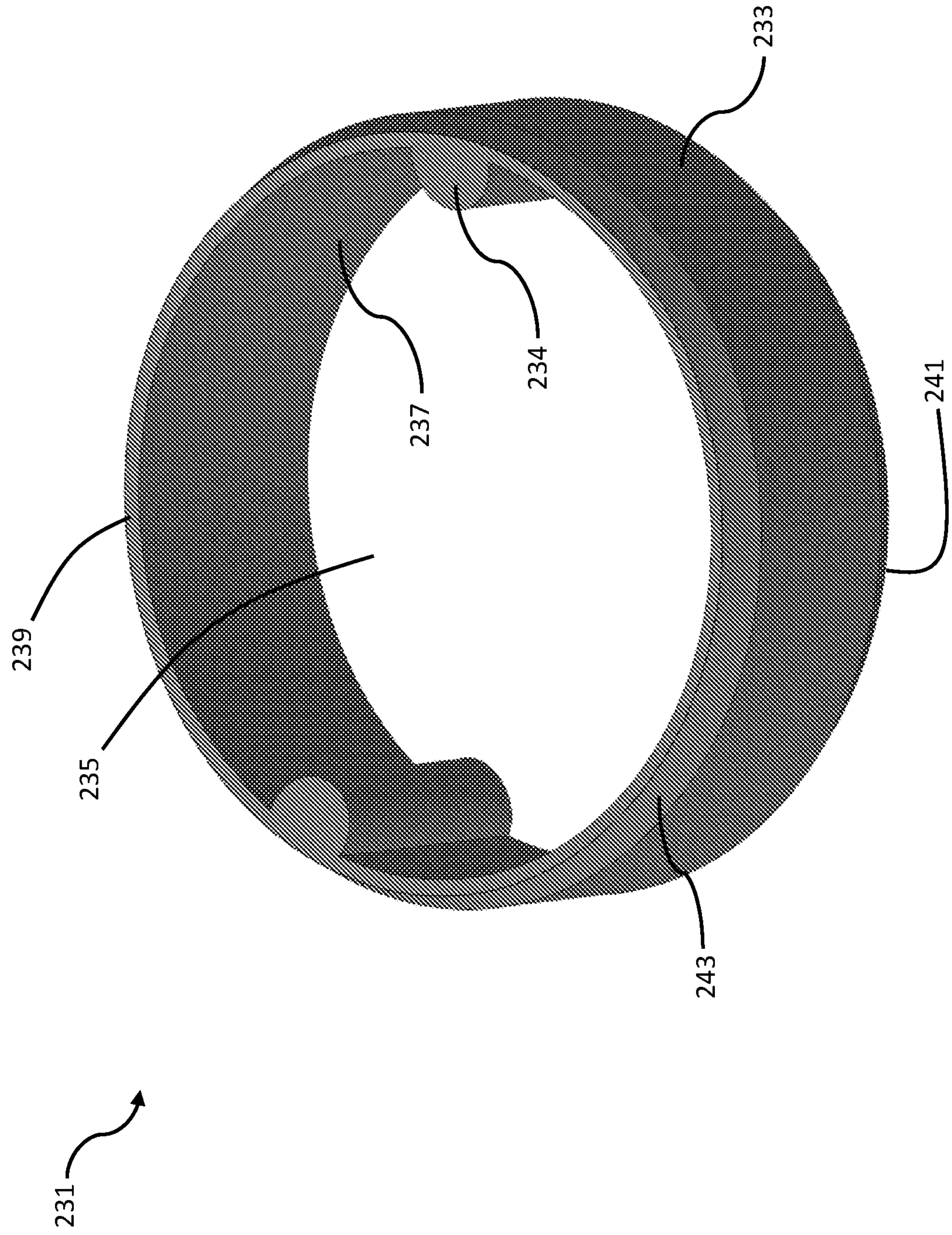
FIG. 14 is a perspective view of a clocking ring of the fuel injector of FIG. 13.
Figure 15:
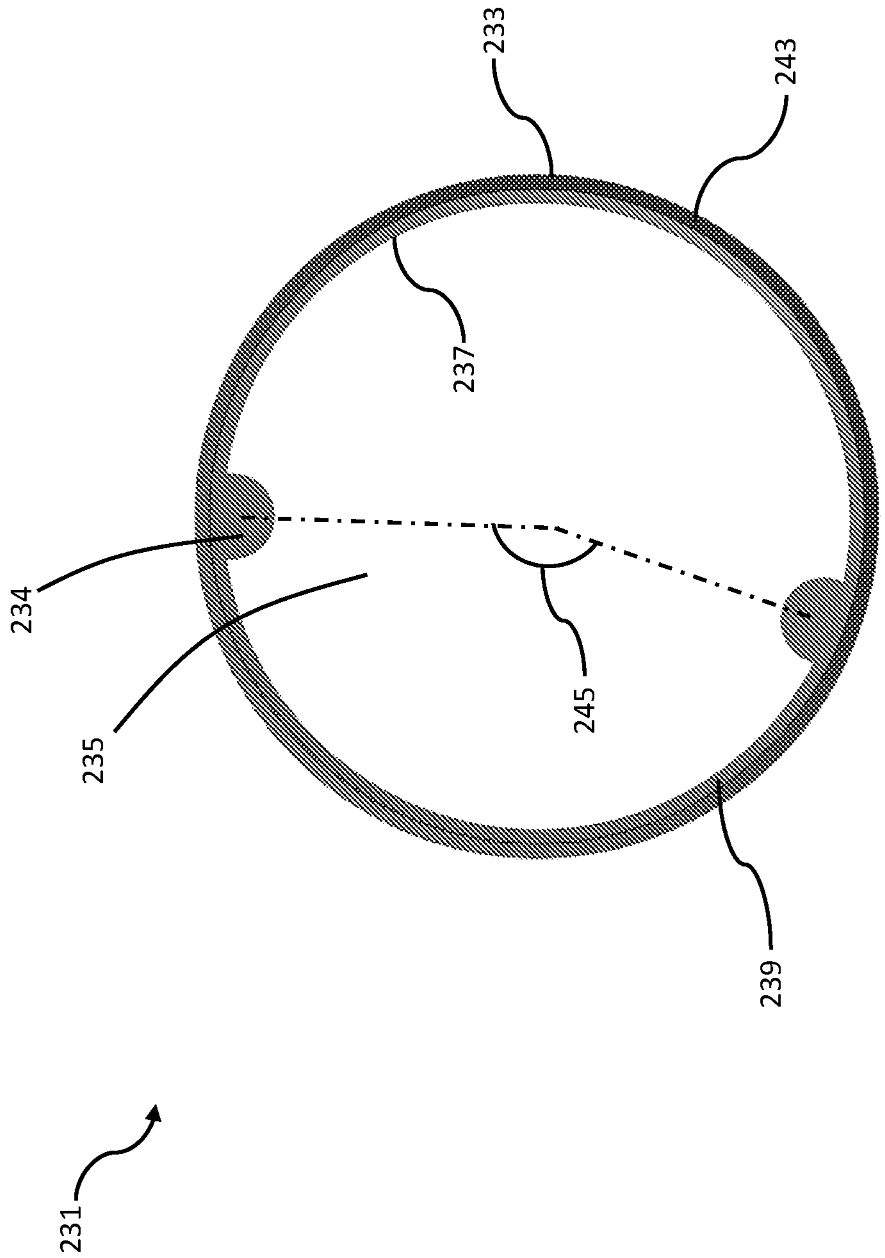
FIG. 15 is a top view of the clocking ring of FIG. 14.

Clocking ring 231 is shown in more detail in FIGS. 14 and 15. As shown, ring 231 includes side wall 233 which has an interior surface 237 and defines a central opening 235. Splines 234 are formed on interior surface 237 and extend substantially from an upper edge 239 of ring 231 to a lower edge 241 of ring 231. A chamfer 243 is formed alongside wall 233 adjacent upper edge 239. A similar chamfer (not shown) may be formed adjacent lower edge 241 of ring 231. The chamfers permit ring 231 to fit within nozzle retainer 240. As best shown in FIG. 15, splines 234 are spaced apart from one another in a circumferential direction along interior surface 237 of ring 231 by an angle 245 that is less than 180 degrees. In one embodiment, splines 234 are spaced apart by an angle of approximately 160 degrees. By forming ring 231 with splines 234 spaced apart in this manner (i.e., not spaced by 180 degrees), it is ensured that ring 231 can only be assembled in only one way. This may be desirable in embodiments where an odd number of nozzle holes 232 are used. Of course, grooves 224 and 236 are spaced apart using a corresponding spacing angle to receive splines 234.

Figure 16:
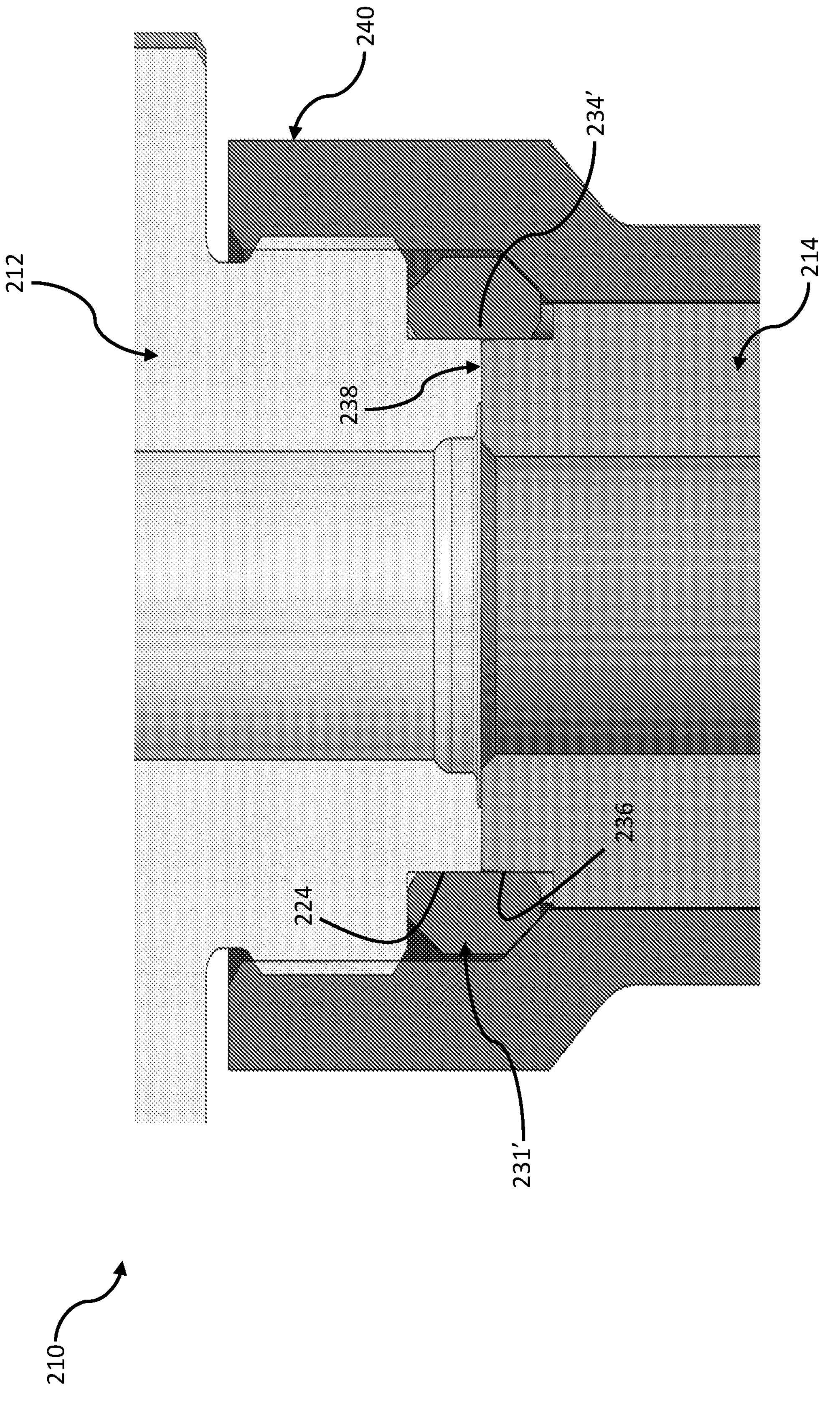
FIG. 16 is an enlarged portion of the fuel injector of FIG. 13 shown partly in phantom and using a clocking ring as shown in FIGS. 17 and 18.
Figure 17:
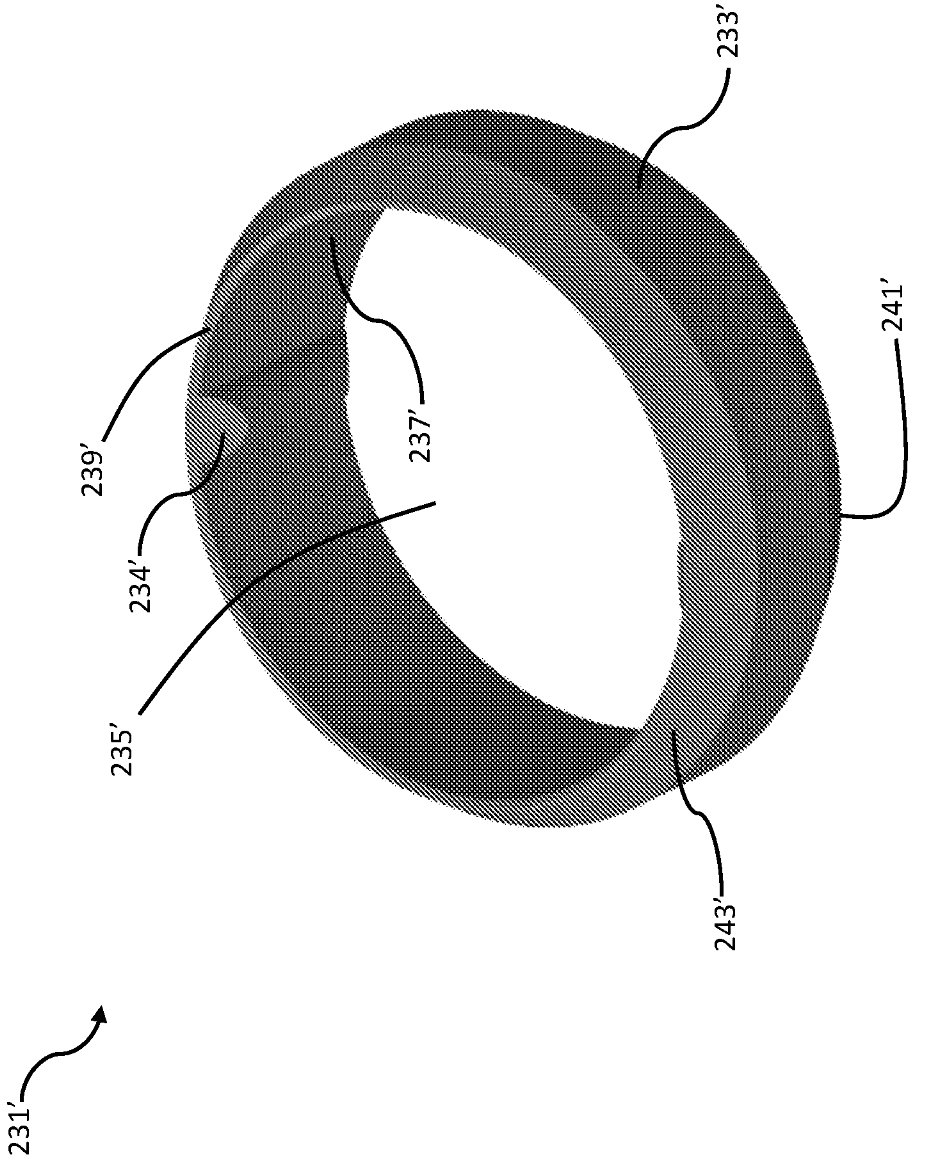
FIG. 17 is a perspective view of another embodiment of a clocking ring according to the present disclosure.
Figure 18:
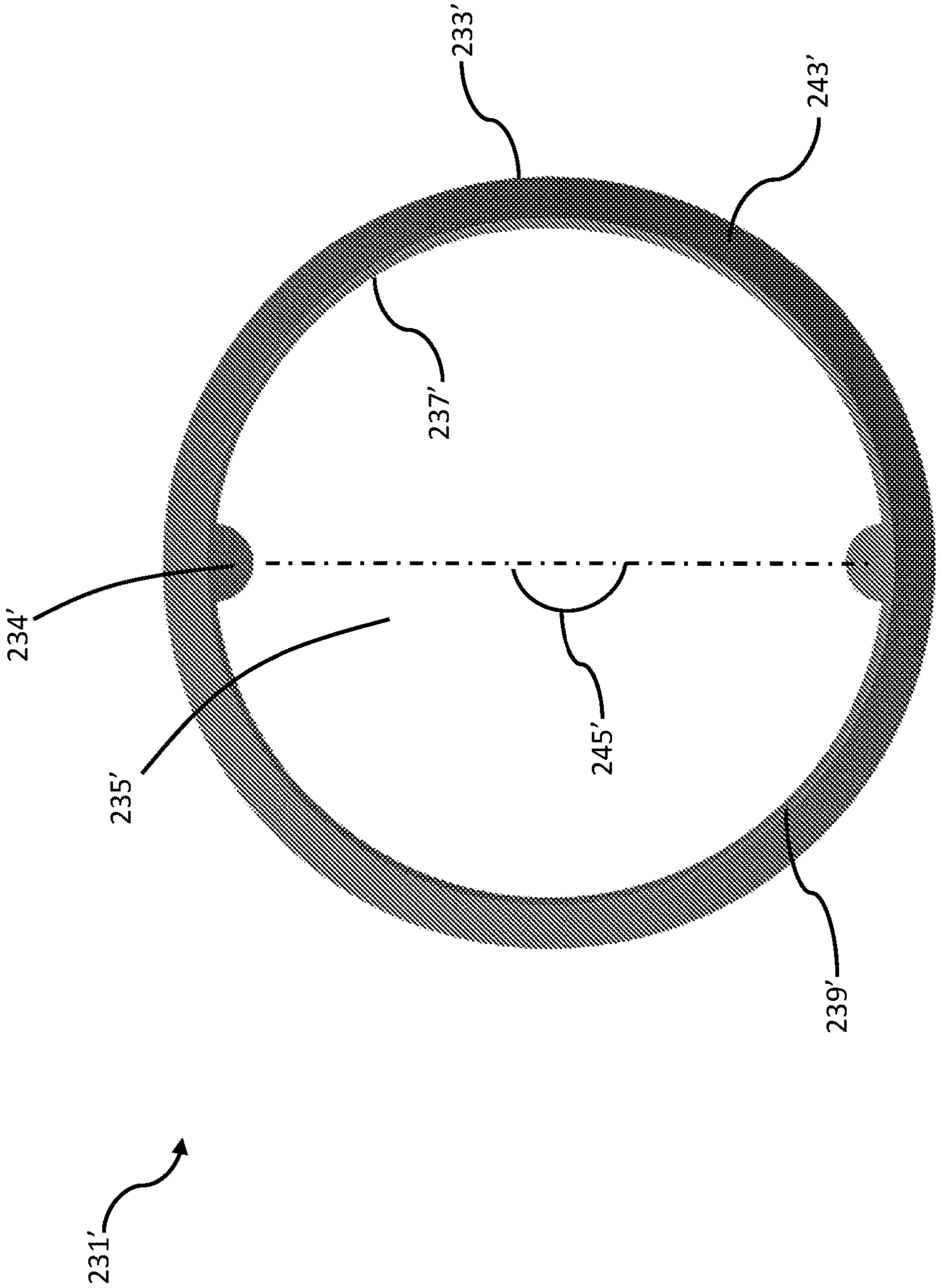
FIG. 18 is a top view of the clocking ring of FIG. 17.

FIG. 16 provides an enlarged view of another embodiment of a clocking ring 231' installed onto fuel injector 210 with splines 234' positioned within grooves 224 of body 212 and grooves 236 of nozzle 214. Clocking ring 231' is depicted in FIGS. 17 and 18 and is generally similar to clocking ring 231 except that splines 234' are spaced apart by an angle of approximately 180 degrees. More specifically, ring 231' includes side wall 233' which has an interior surface 237' and defines a central opening 235'. Splines 234' are formed on interior surface 237' and extend substantially from an upper edge 239' of ring 231' to a lower edge 241' of ring 231'. A chamfer 243' is formed along side wall 233' adjacent upper edge 239'. A similar chamfer (not shown) may be formed adjacent lower edge 241' of ring 231'. The chamfers permit ring 231' to fit within nozzle retainer 240'. As best shown in FIG. 18, splines 234' are spaced apart from one another in a circumferential direction along interior surface 237' of ring 231' by an angle 245' of approximately 180 degrees. By forming ring 231' with splines 234' spaced apart in this manner (i.e., by 180 degrees), it is ensured that ring 231' can only be assembled in either one of two ways. This may be desirable in embodiments where an even number of symmetric nozzle holes 232 are used. Of course, grooves 224 and 236 are spaced apart using a corresponding spacing angle to receive splines 234'.

Figure 19:
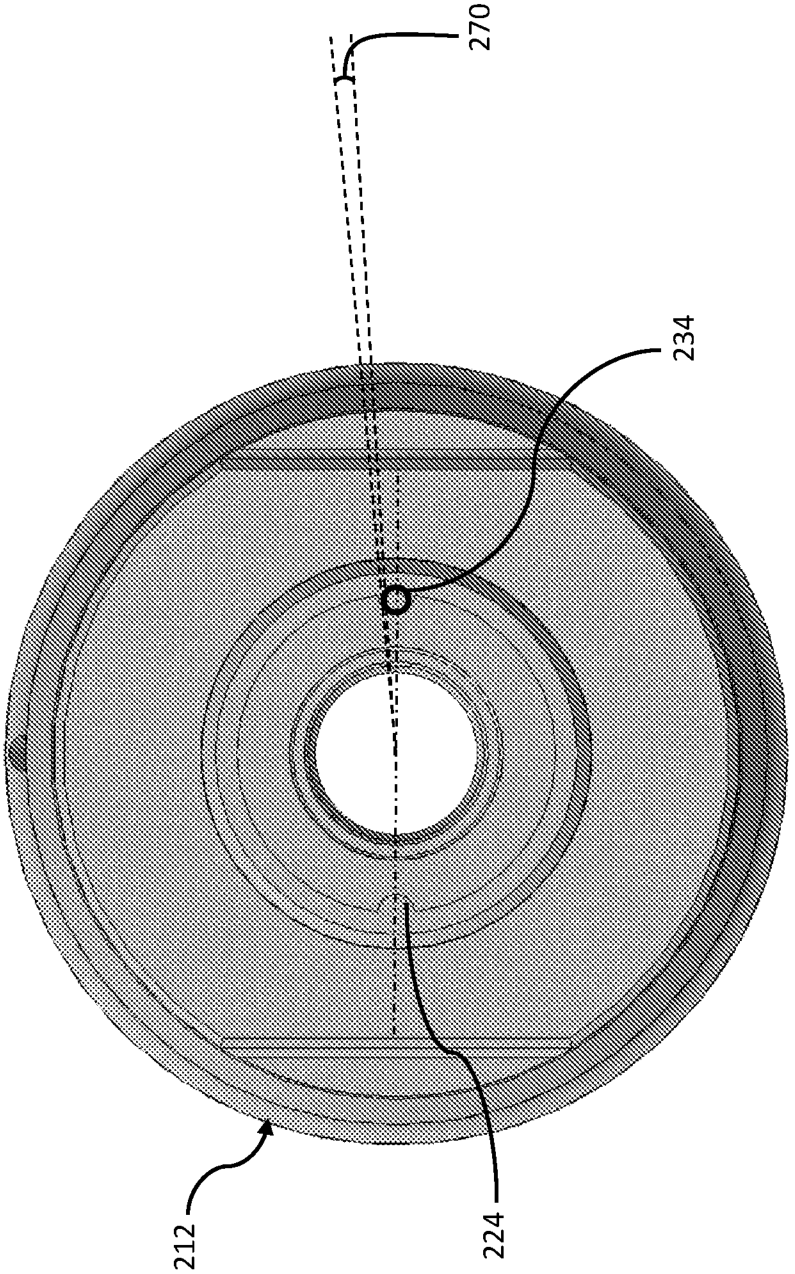
FIG. 19 is a bottom view of a body of the fuel injector of FIG. 13.

Referring now to FIG. 19, an example body 212 is shown to illustrate features relating to nozzle to body tolerance. As shown, body 212 includes two grooves 224 (in this example spaced apart by approximately 180 degrees, solely for the purpose of illustrating the tolerance error. Grooves 224 may be formed very closely match the outer surface of splines 234 (illustrated by a circle in this example). The close match between the size of grooves 224 (and grooves 236) and splines 234 results in a nozzle to body tolerance error illustrated by angle 270. In certain embodiments, the tolerances between these components may be maintained such that the total nozzle to body tolerance is between 1.4 and 9.0 degrees, and the angular orientation error of spray holes 232 relative to body 212 is within +/− one degree.

Figure 20:
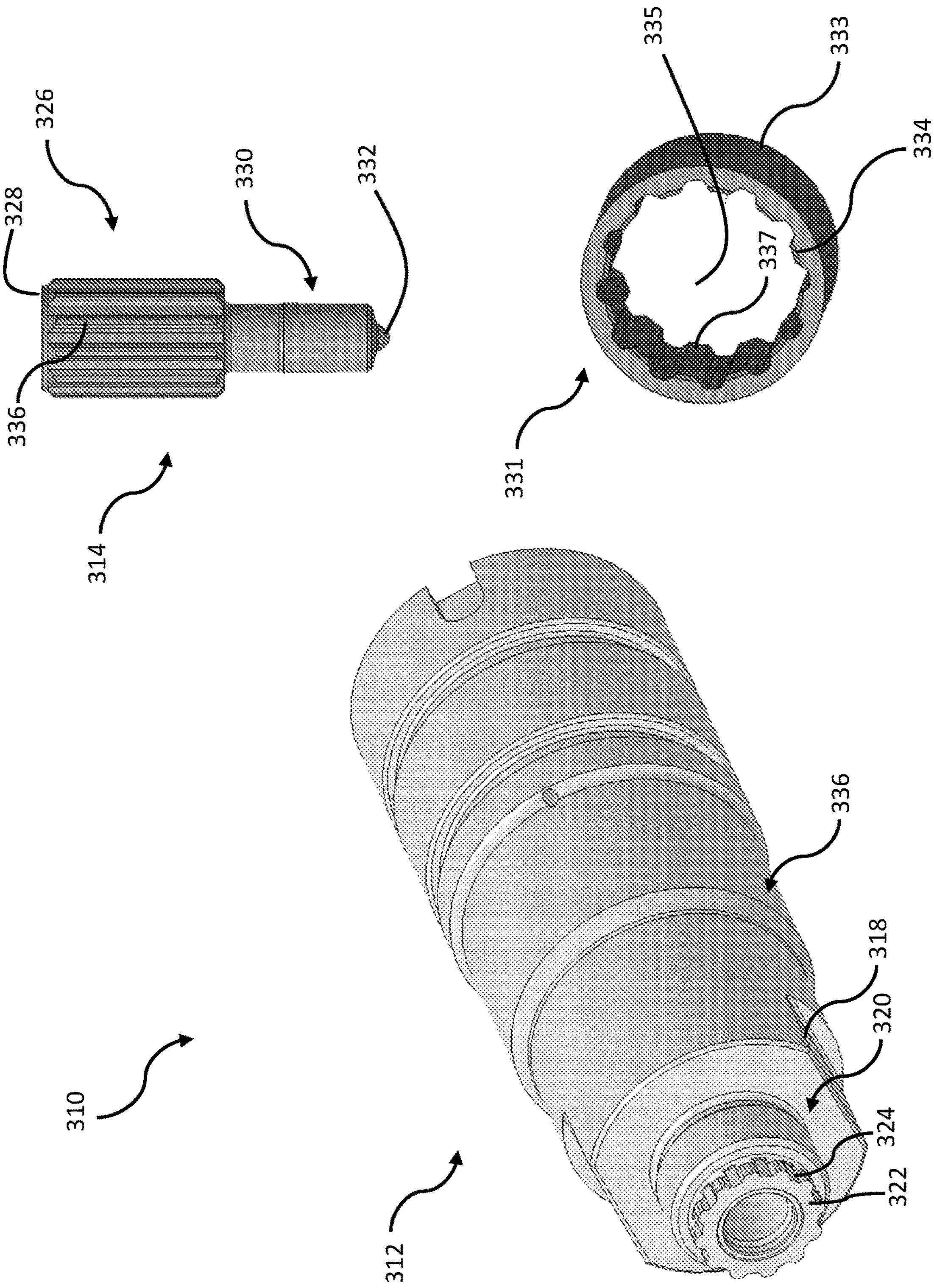
FIG. 20 is an exploded, perspective view of a fuel injector according to another embodiment of the present disclosure.

Referring now to FIG. 20, yet another embodiment of a fuel injector 310 according to the present disclosure is shown. Fuel injector 310 includes 12 grooves 324 formed adjacent sealing surface 322 of lower portion 320 of body 312. Nozzle 314 similarly includes 12 grooves 336 formed along the length of upper portion 326 of nozzle 314 from sealing surface 328. Similarly, clocking ring 331 includes 12 splines 334 on interior surface 337 spaced to correspond to the spacing between grooves 324, which is the same as the spacing between grooves 336.

Figure 21:
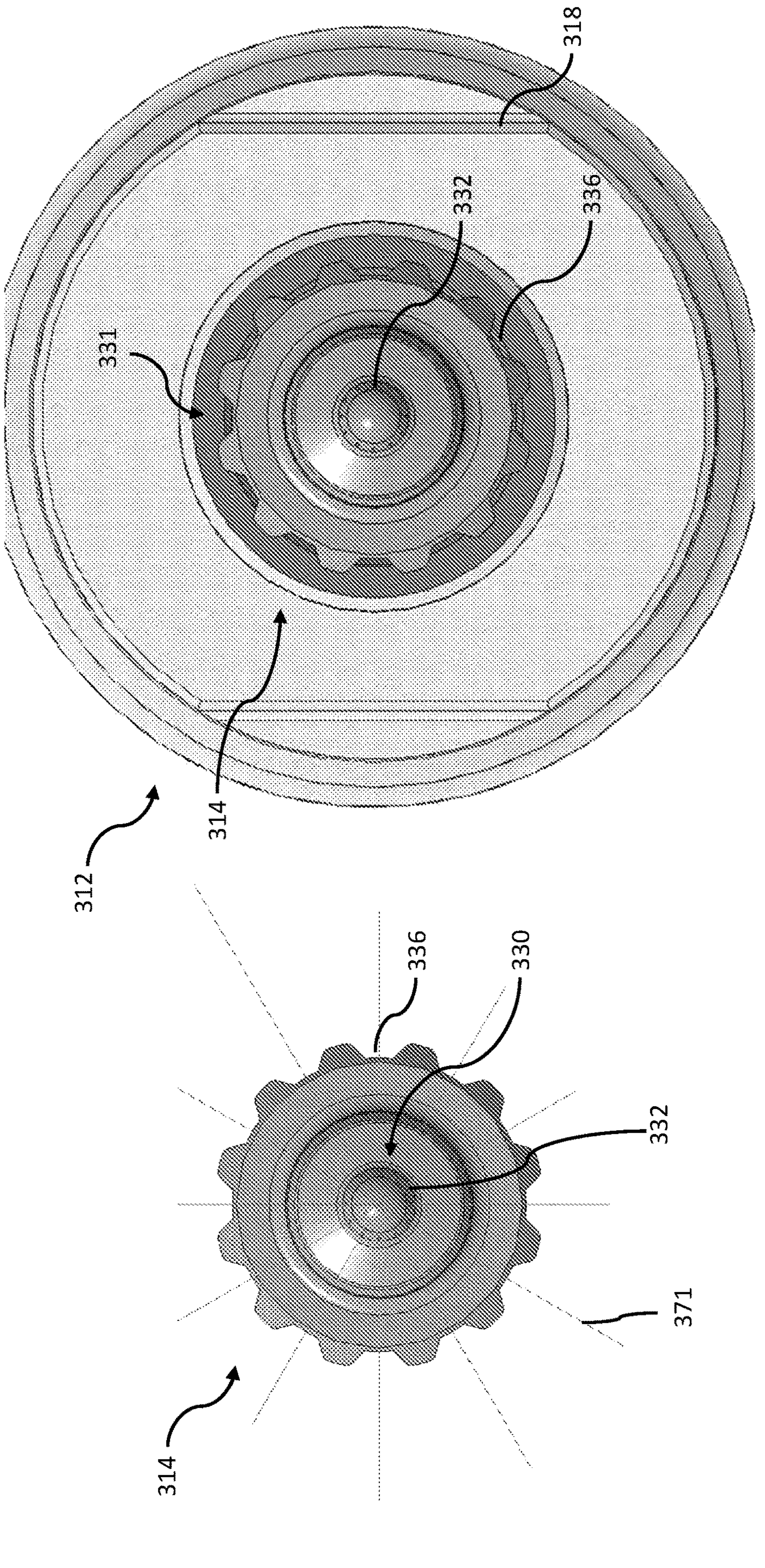
FIG. 21 is a bottom view of a nozzle and a body of the fuel injector of FIG. 20.
Figure 22:
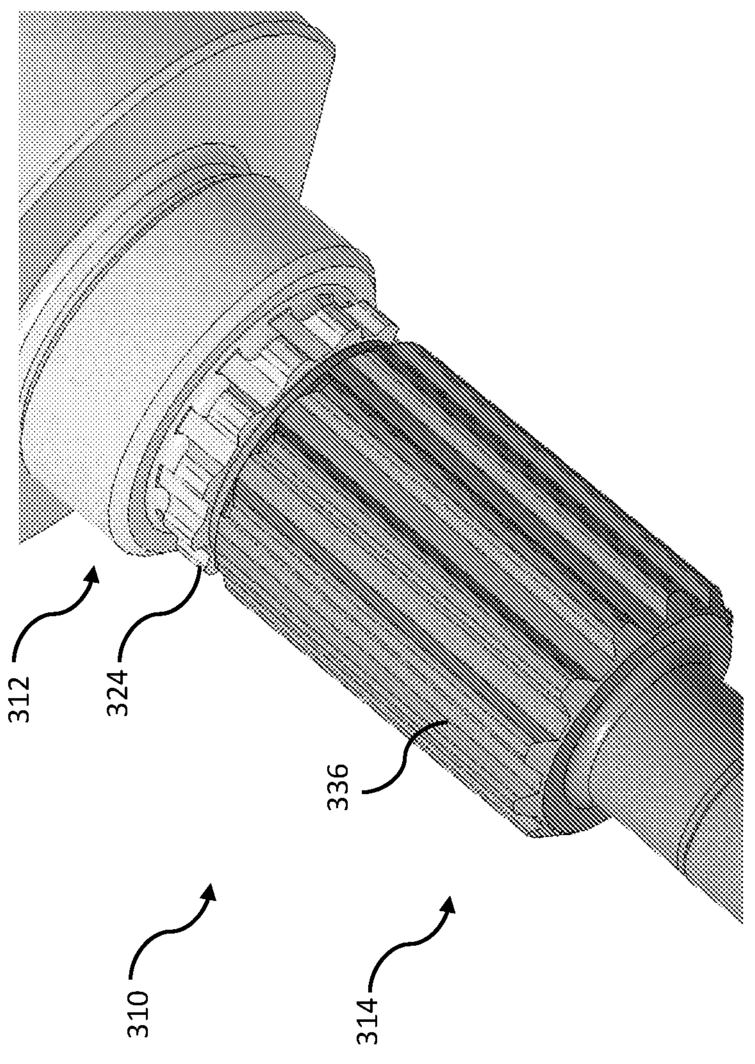
FIG. 22 is a partial perspective view of the fuel injector of FIG. 20 in a first partially assembled state.
Figure 23:
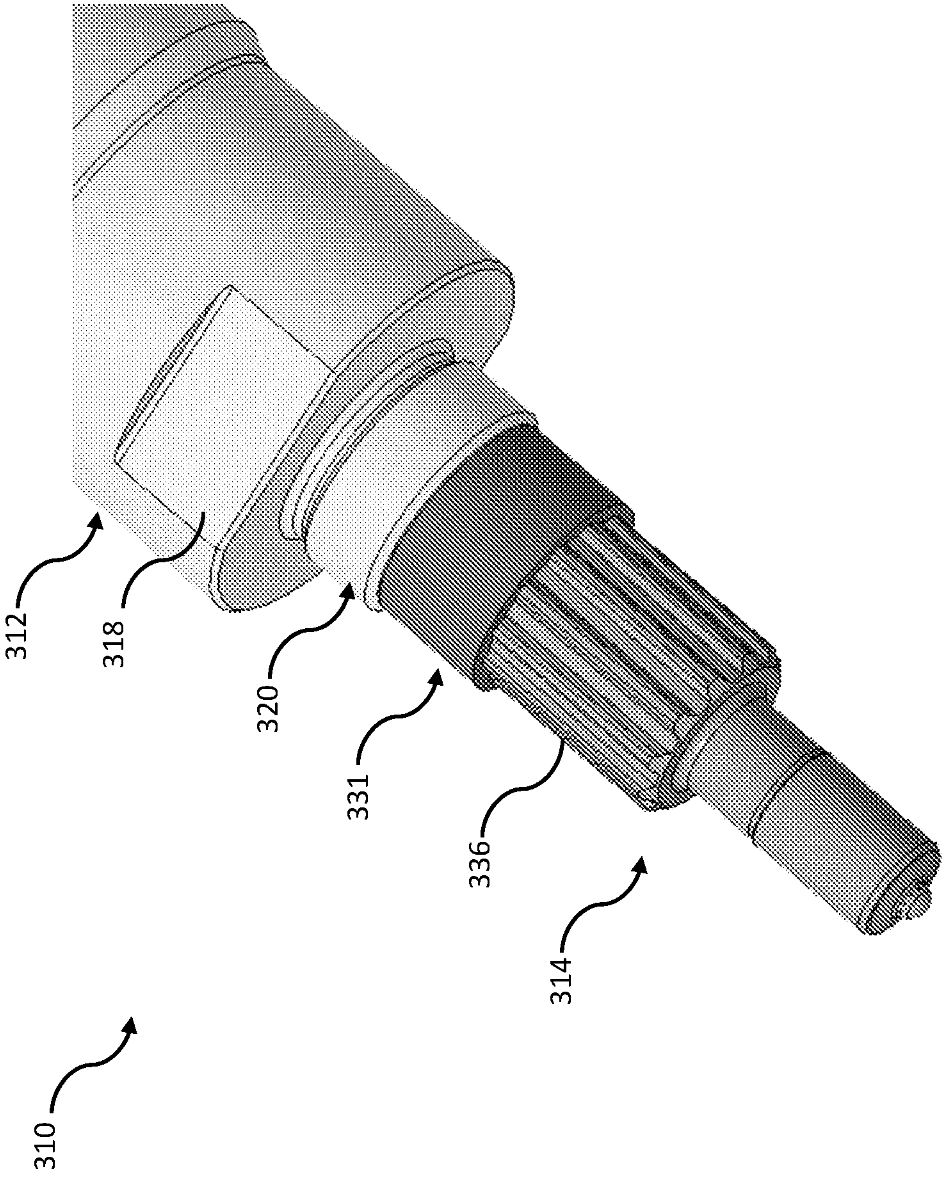
FIG. 23 is a partial perspective view of the fuel injector of FIG. 20 in a second partially assembled state.

As best shown in FIG. 21, in this embodiment grooves 336 of nozzle 314 align directly with 12 nozzle holes 332 formed in lower portion 330 of nozzle 314. A radial axis 371 extends from the central axis of nozzle 314 through each nozzle hole 332 and a center of a corresponding groove 336. In this manner, nozzle holes 332 may be aligned in any of 12 different radial orientations to provide a desired spray pattern of fuel. FIG. 22 shows grooves 324 of body 312 aligned with grooves 336 of nozzle 314 before installation of clocking ring 331. FIG. 23 shows clocking ring 331 installed onto nozzle 314 and body 312. As should be understood from the figures, unlike previous embodiments, in fuel injector 310 clocking ring 331 may be installed over nozzle 314 when nozzle 314 is positioned adjacent body 312.

Figure 24:
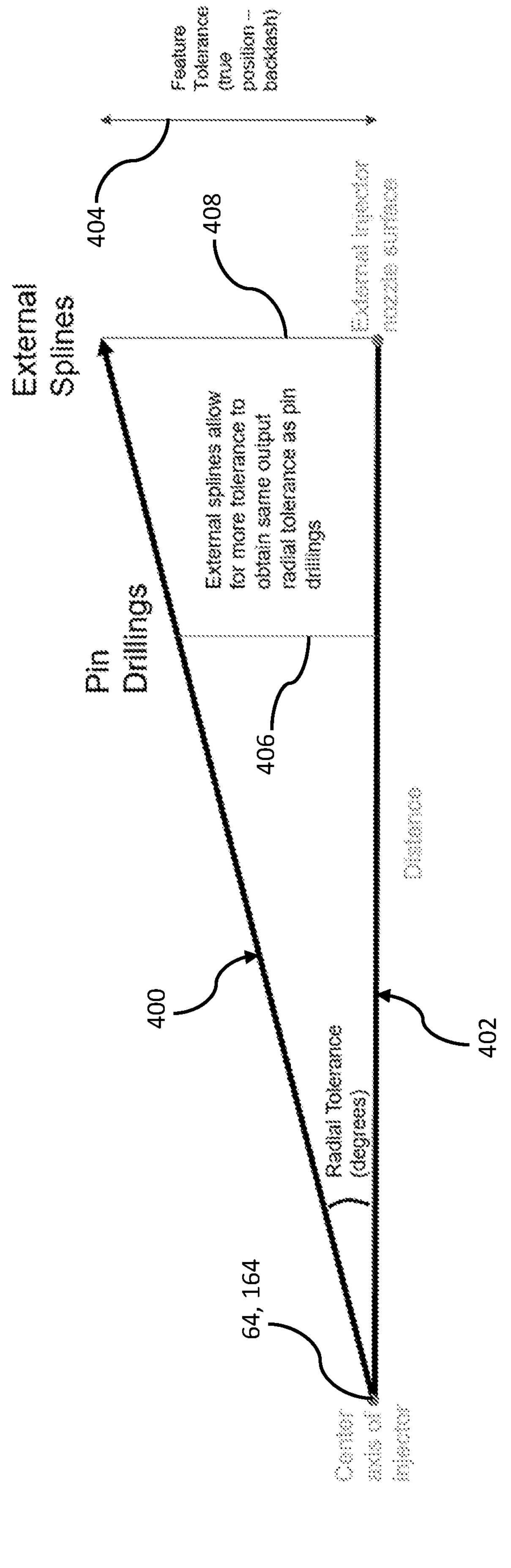
FIG. 24 is a chart depicting tolerance relationship between various components of the fuel injector of FIGS. 1-5 and the fuel injectors of FIGS. 6-24.

Finally, referring to FIG. 24, a conceptual graph relating the location of alignment guides (pins 34 and splines 123, 234, 334) relative to central axis 64, 164 and the corresponding tolerance error of nozzle 14, 114, 214, 314. For simplicity, reference numbers of pins and splines are omitted for the remainder of the description of FIG. 24. As shown, a radial tolerance of X degrees (line 400) results in an increased true position error 404 (i.e., backlash) of the nozzle and nozzle holes with distance (line 402) from central axis 64, 164. In other words, a small tolerance error near the central axis will result in a larger true position error at the external nozzle surface than the same small tolerance error would cause if made farther from the central axis. More specifically, the tolerance error between the bores and pins of fuel injector 10 (line 406), which are positioned relatively close to the central axis 64, must be smaller than the tolerance error between the grooves and splines of fuel injector 110, for example, to result in the same true position error 404. Achieving this smaller tolerance may increase cost and complexity of manufacturing.

It should be understood that any of the features of the various embodiments described herein may be combined with features of other embodiments to provide further variants of the principles of the present disclosure. Additionally, it should be understood that in other embodiments, grooves formed on the nozzles and bodies may be replaced with external protrusions or splines, and the splines formed on the interior surface of the clocking rings may be replaced with grooves. Moreover, it is contemplated that the alignment features and alignment guides need not be parallel to the central axis of the fuel injectors.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

The connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus

We claim:

1. A fuel injector, comprising:

a body including a plurality of body alignment features;

a nozzle including a plurality of nozzle alignment features and a plurality of nozzle holes for injecting fuel; and a clocking ring having an inner surface with a plurality of alignment guides configured to mate with the plurality of body alignment features and the plurality of nozzle alignment features to align the nozzle with the body such that the plurality of nozzle holes is in a desired orientation relative to the body, wherein each of the plurality of alignment guides is spaced apart by an angle of 180 degrees from another of the plurality of alignment guides to ensure the clocking ring can be mated with the plurality of body alignment features and the plurality of nozzle alignment features in at least two ways to provide at least two different orientations of the plurality of nozzle holes of the nozzle relative to the body;

wherein the clocking ring includes a side wall, an upper edge, a lower edge, and a circumferential chamfer formed along the side wall adjacent at least one of the upper edge and the lower edge.

2. The fuel injector of claim 1, wherein the plurality of alignment guides are splines formed on the inner surface of the clocking ring.

3. The fuel injector of claim 2, wherein the plurality of body alignment features includes a pair of body grooves formed into an external surface of the body, the plurality of nozzle alignment features includes a pair of nozzle grooves formed into an external surface of the nozzle, and the splines include a pair of splines equally spaced apart from one another along the inner surface of the clocking ring and disposed to engage the pair of body grooves and the pair of nozzle grooves to inhibit rotation of the body and the nozzle relative to one another.

4. The fuel injector of claim 1, wherein the plurality of alignment guides are equally spaced apart from one another along the inner surface of the clocking ring.

5. The fuel injector of claim 1, further comprising a nozzle retainer including one end configured to mate with an outer surface of the body, another end having a shoulder configured to retain the nozzle in engagement with the body, and internal threads configured to mate with external threads formed on the outer surface of the body to attach the nozzle retainer to the body to form a sealing interface between the body and the nozzle that inhibits fuel from passing between a sealing surface of the body and a sealing surface of the nozzle during operation.

6. The fuel injector of claim 1, wherein the body includes a datum oriented relative to the plurality of body alignment features so that the plurality of nozzle alignment features precisely align the plurality of nozzle holes with the datum in either of the at least two orientations relative to a combustion chamber of an engine.

7. The fuel injector of claim 1, wherein the plurality of alignment guides extend in non-parallel relationship to a longitudinal axis of the fuel injector.

8. The fuel injector of claim 1, wherein at least one of the plurality of body alignment features and the plurality of nozzle alignment features is formed using one of broaching or wobble broaching.

9. The fuel injector of claim 1, wherein the plurality of alignment guides are formed using broaching.

10. The fuel injector of claim 1, wherein the plurality of alignment guides are formed with the clocking ring as a unitary sintered metal part.

11. The fuel injector of claim 1, wherein the plurality of alignment guides are formed on the inner surface of the clocking ring before the clocking ring is hardened.

12. The fuel injector of claim 1, wherein the body includes a first sealing surface and the nozzle includes a second sealing surface in contact with the first sealing surface to form an interface seal that inhibits fuel from passing between the body and the nozzle during operation.

13. A fuel injector, comprising:

a body having body grooves formed into an exterior, circumferential surface of one end of the body;

a nozzle having nozzle grooves formed into an exterior, circumferential surface of one end of the nozzle and spaced apart from one another to correspond to a spacing between the body grooves, the nozzle including a plurality of nozzle holes adjacent an end of the nozzle for injecting fuel into a combustion chamber of an engine; and a clocking ring having an interior surface with a plurality of splines extending therefrom, the plurality of splines being disposed circumferentially on the interior surface to slide into the body grooves and the nozzle grooves to retain the body and the nozzle in a desired orientation relative to one another, wherein each of the plurality of splines is spaced apart by an angle of 180 degrees from another of the plurality of splines to ensure the clocking ring can be mated with the body grooves and the nozzle grooves in at least two ways to provide at least two different orientations of the plurality of nozzle holes of the nozzle relative to the body.

14. The fuel injector of claim 13, wherein the clocking ring further includes a side wall, an upper edge, a lower edge, and a circumferential chamfer formed along the side wall adjacent at least one of the upper edge and the lower edge.

15. The fuel injector of claim 13, further comprising a nozzle retainer including one end configured to mate with the exterior, circumferential surface of the body, another end having a shoulder configured to retain the nozzle in engagement with the body, and internal threads configured to mate with external threads formed on the exterior, circumferential surface of the body to attach the nozzle retainer to the body to form a sealing interface between the body and the nozzle that inhibits fuel from passing between a sealing surface of the body and a sealing surface of the nozzle during operation.

16. The fuel injector of claim 13, wherein the body includes a datum oriented relative to the body grooves so that the nozzle grooves precisely align the plurality of nozzle holes with the datum in either of the at least two orientations relative to the combustion chamber.

17. The fuel injector of claim 13, wherein the splines extend in non-parallel relationship to a longitudinal axis of the fuel injector.

18. A method of assembling a fuel injector, comprising:

forming a body having a plurality of body alignment features on an outer surface;

forming a nozzle having a plurality of nozzle alignment features on an outer surface, the nozzle including a plurality of nozzle holes for injecting fuel;

forming a ring having a plurality of internal alignment features;

installing the ring onto the body such that the body alignment features mate with the internal alignment features; and installing the nozzle into the ring to engage the body such that the nozzle alignment features mate with the internal alignment features;

wherein each of the plurality of internal alignment features is spaced apart by an angle of 180 degrees from another of the plurality of internal alignment features to ensure the ring can be mated with the plurality of body alignment features and the plurality of nozzle alignment features in at least two ways to provide at least two different orientations of the plurality of nozzle holes of the nozzle relative to the body;

wherein at least one of the body alignment features, the nozzle alignment features and the internal alignment features is formed using broaching.

19. The method of claim 18, wherein forming the ring includes forming the internal alignment features before hardening the ring and forming the internal alignment features and the ring as a unitary sintered metal part.

20. The method of claim 19, further comprising placing a nozzle retainer over the nozzle, the ring, and the body such that a portion of the nozzle having nozzle holes extends through an opening in the nozzle retainer and threading the nozzle retainer onto threads formed on the outer surface of the body to form a sealing interface between the body and the nozzle that inhibits fuel from passing between a sealing surface of the body and a sealing surface of the nozzle during operation.

* * * * *